(12) United States Patent
Xu et al.

(10) Patent No.: US 12,040,498 B1
(45) Date of Patent: *Jul. 16, 2024

(54) TOP PATCH, ENERGY-STORAGE APPARATUS, AND ELECTRICITY-CONSUMPTION DEVICE

(71) Applicants: Shenzhen Hithium Energy Storage Technology Co., Ltd., Guangdong (CN); Xiamen Hithium Energy Storage Technology Co., Ltd., Fujian (CN)

(72) Inventors: Weidong Xu, Guangdong (CN); Yongfeng Xiong, Guangdong (CN); Feng Wang, Guangdong (CN)

(73) Assignees: Shenzhen Hithium Energy Storage Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,897

(22) Filed: Dec. 11, 2023

(30) Foreign Application Priority Data

Feb. 9, 2023 (CN) .......................... 202310091038.3

(51) Int. Cl.
*H01M 50/15* (2021.01)
*H01M 50/119* (2021.01)
(Continued)

(52) U.S. Cl.
CPC ......... *H01M 50/15* (2021.01); *H01M 50/119* (2021.01); *H01M 50/143* (2021.01);
(Continued)

(58) Field of Classification Search
CPC .. H01M 50/15; H01M 50/119; H01M 50/143; H01M 50/164; H01M 50/317;
(Continued)

(56) References Cited

U.S. PATENT DOCUMENTS

2006/0115726 A1* 6/2006 Jung ................. H01M 10/0436
429/82
2010/0012266 A1 1/2010 Hashino et al.
(Continued)

FOREIGN PATENT DOCUMENTS

| CN | 103100591 A | 5/2013 |
|---|---|---|
| CN | 103324258 A | 9/2013 |

(Continued)

OTHER PUBLICATIONS

English Translation of CN216958258U—Battery Cover Plate assembly and lithium battery with same; Great Titanium New Energy CO LTD; Jul. 12, 2022 (Year: 2022).*
English Translation of CN213278202U—Power battery top cover patch assembly structure; Xiamen Hithium New Energy Technology Co LTD; May 25, 2021 (Year: 2021).*
(Continued)

*Primary Examiner* — Matthew T Martin
*Assistant Examiner* — Adam J Francis
(74) *Attorney, Agent, or Firm* — IP Spring

(57) ABSTRACT

A top patch, an energy-storage apparatus, and an electricity-consumption device are provided. The top patch defines a first pole through-hole and a first hole spaced apart from the first pole through-hole in a length direction of the top patch, the first hole includes two side walls arranged opposite to each other in a width direction of the top patch, each of the two side walls is provided with an extension bump, the first hole at one side of the extension bump forms a first explosion-proof valve through-hole, the first hole at the other side of the extension bump forms a second pole through-hole, and an angle at which each of the hole wall of the first pole through-hole, the hole wall of the second pole through-hole,
(Continued)

and the hole wall of the first explosion-proof valve through-hole is inclined relative to a connecting surface ranges from 25 degrees to 85 degrees.

20 Claims, 9 Drawing Sheets

(51) Int. Cl.
*H01M 50/143* (2021.01)
*H01M 50/164* (2021.01)
*H01M 50/197* (2021.01)
*H01M 50/317* (2021.01)
*H01M 50/325* (2021.01)
*H01M 50/333* (2021.01)
*H01M 50/342* (2021.01)

(52) U.S. Cl.
CPC ....... *H01M 50/164* (2021.01); *H01M 50/317* (2021.01); *H01M 50/325* (2021.01); *H01M 50/333* (2021.01); *H01M 50/342* (2021.01); *H01M 50/3425* (2021.01); *H01M 50/197* (2021.01); *H01M 2220/20* (2013.01)

(58) Field of Classification Search
CPC ............. H01M 50/325; H01M 50/333; H01M 50/342; H01M 50/3425; H01M 50/197
See application file for complete search history.

(56) References Cited

U.S. PATENT DOCUMENTS

| | | | |
|---|---|---|---|
| 2011/0287286 A1 | 11/2011 | Ahn et al. | |
| 2023/0231241 A1* | 7/2023 | Xiao | ................... H01M 50/593 |
| | | | 429/185 |

FOREIGN PATENT DOCUMENTS

| | | | | |
|---|---|---|---|---|
| CN | 205985096 U | | | 2/2017 |
| CN | 206806373 U | | | 12/2017 |
| CN | 207303258 U | | | 5/2018 |
| CN | 207638704 U | | | 7/2018 |
| CN | 208225925 U | | | 12/2018 |
| CN | 213278202 U | | * | 5/2021 |
| CN | 213278202 U | | | 5/2021 |
| CN | 215242325 U | | | 12/2021 |
| CN | 215869713 U | | | 2/2022 |
| CN | 216958258 U | | * | 7/2022 |
| CN | 216958258 U | | | 7/2022 |
| CN | 217589165 U | | | 10/2022 |
| JP | 2016030299 A | | | 3/2016 |

OTHER PUBLICATIONS

WIPO, International Search Report and Written Opinion for International Patent Application No. PCT/CN2023/075283, Oct. 27, 2023, 12 pages.
CNIPA, Notice of Allowance for corresponding Chinese Patent Application No. 202310091038.3, Apr. 28, 2023, 10 pages.

* cited by examiner

TOP PATCH, ENERGY-STORAGE APPARATUS, AND ELECTRICITY-CONSUMPTION DEVICE

CROSS-REFERENCE TO RELATED APPLICATIONS

This application claims priority under 35 U.S.C. § 119(a) to Chinese Patent Application No. 202310091038.3, filed Feb. 9, 2023, the entire disclosure of which is incorporated herein by reference.

TECHNICAL FIELD

This disclosure relates to the field of energy-storage technologies, and in particular to a top patch, an energy-storage apparatus, and an electricity-consumption device.

BACKGROUND

With development of clean energy, more and more devices use batteries and other energy-storage apparatuses as main power sources, for example, lithium batteries and lithium iron phosphate energy-storage batteries. Generally, a top patch is arranged on a top cap of a battery with electrodes. In this way, an insulation effect can be achieved to prevent short circuiting between the battery and another circuit, and the top cap of the battery can be protected to prevent the top cap from being directly impacted by an external force.

SUMMARY

In a first aspect, a top patch is provided in the present disclosure. The top patch is configured to be attached to a smooth aluminum sheet of an energy-storage apparatus. The top patch defines a first pole through-hole and a first hole spaced apart from the first pole through-hole in a length direction of the top patch. The first hole includes two side walls arranged opposite to each other in a width direction of the top patch. Each of the two side walls is provided with an extension bump. The first hole at one side of the extension bump forms a first explosion-proof valve through-hole, and the first hole at the other side of the extension bump forms a second pole through-hole. The top patch further includes a connecting surface configured to be connected to the smooth aluminum sheet. Each of a hole wall of the first pole through-hole, a hole wall of the second pole through-hole, and a hole wall of the first explosion-proof valve through-hole is arranged obliquely relative to the connecting surface. An angle at which each of the hole wall of the first pole through-hole, the hole wall of the second pole through-hole, and the hole wall of the first explosion-proof valve through-hole is inclined relative to the connecting surface ranges from 25 degrees to 85 degrees.

In a second aspect, an energy-storage apparatus is provided in the present disclosure. The energy-storage apparatus includes a smooth aluminum sheet and a top patch. The top patch is attached to a top surface of the smooth aluminum sheet. The top patch defines a first pole through-hole and a first hole spaced apart from the first pole through-hole in a length direction of the top patch. The first hole includes two side walls arranged opposite to each other in a width direction of the top patch. Each of the two side walls is provided with an extension bump. The first hole at one side of the extension bump forms a first explosion-proof valve through-hole, and the first hole at the other side of the extension bump forms a second pole through-hole. The top patch further includes a connecting surface configured to be connected to the smooth aluminum sheet. Each of a hole wall of the first pole through-hole, a hole wall of the second pole through-hole, and a hole wall of the first explosion-proof valve through-hole is arranged obliquely relative to the connecting surface. An angle at which each of the hole wall of the first pole through-hole, the hole wall of the second pole through-hole, and the hole wall of the first explosion-proof valve through-hole is inclined relative to the connecting surface ranges from 25 degrees to 85 degrees.

In a third aspect, an electricity-consumption device is provided in the present disclosure. The electricity-consumption device includes an energy-storage apparatus. The energy-storage apparatus includes a smooth aluminum sheet and a top patch, where the top patch is attached to a top surface of the smooth aluminum sheet. The top patch defines a first pole through-hole and a first hole spaced apart from the first pole through-hole in a length direction of the top patch. The first hole includes two side walls arranged opposite to each other in a width direction of the top patch. Each of the two side walls is provided with an extension bump. The first hole at one side of the extension bump forms a first explosion-proof valve through-hole, and the first hole at the other side of the extension bump forms a second pole through-hole. The top patch further includes a connecting surface configured to be connected to the smooth aluminum sheet. Each of a hole wall of the first pole through-hole, a hole wall of the second pole through-hole, and a hole wall of the first explosion-proof valve through-hole is arranged obliquely relative to the connecting surface. An angle at which each of the hole wall of the first pole through-hole, the hole wall of the second pole through-hole, and the hole wall of the first explosion-proof valve through-hole is inclined relative to the connecting surface ranges from 25 degrees to 85 degrees.

BRIEF DESCRIPTION OF THE DRAWINGS

To describe technical solutions in the present disclosure more clearly, the following briefly introduces the accompanying drawings required for describing implementations. The accompanying drawings in the following description show some implementations of the present disclosure, and a person of ordinary skill in the art may still derive other drawings from these accompanying drawings.

DETAILED DESCRIPTION

Figure 1:
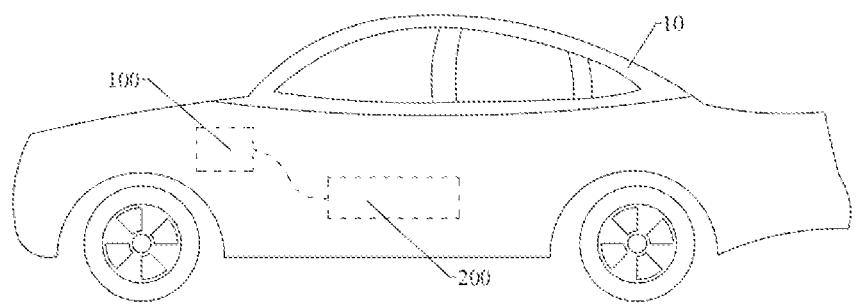
FIG. 1 is a schematic structural diagram of an electricity-consumption device according to an embodiment of the present disclosure.

For ease of understanding, terms involved in embodiments of the present disclosure are first explained.

"And/or" is only an association relationship for describing associated objects and represents that three relationships may exist. For example, A and/or B may represent the following three cases: Only A exists, both A and B exist, and only B exists.

"Multiple" means two or more than two.

"Connection" may be understood in a broad sense. For example, a connection between A and B may be a direct connection between A and B, or an indirect connection between A and B through an intermediary.

Implementations of the present disclosure are clearly described below with reference to the accompanying drawings.

Currently, a pattern portion required for being mounted with an end cap assembly is generally formed by cutting a sheet for preparing the top patch, and offcuts corresponding to the pattern portion are removed, so that the top patch is adapted to a shape of related functional parts of the end cap assembly. Because the offcuts to be cut in the top patch are not easy to be removed, machining time costs of the top patch increase, and production efficiency of the energy-storage apparatus decreases.

Embodiments of the present disclosure provide a top patch, an energy-storage apparatus, and an electricity-consumption device that are capable of improving production efficiency.

In a first aspect, a top patch is provided in the present disclosure. The top patch is configured to be attached to a smooth aluminum sheet of an energy-storage apparatus. The top patch defines a first pole through-hole and a first hole spaced apart from the first pole through-hole in a length direction of the top patch. The first hole includes two side walls arranged opposite to each other in a width direction of the top patch. Each of the two side walls is provided with an extension bump. The first hole at one side of the extension bump forms a first explosion-proof valve through-hole, and the first hole at the other side of the extension bump forms a second pole through-hole. The top patch further includes a connecting surface configured to be connected to the smooth aluminum sheet. Each of a hole wall of the first pole through-hole, a hole wall of the second pole through-hole, and a hole wall of the first explosion-proof valve through-hole is arranged obliquely relative to the connecting surface. An angle at which each of the hole wall of the first pole through-hole, the hole wall of the second pole through-hole, and the hole wall of the first explosion-proof valve through-hole is inclined relative to the connecting surface ranges from 25 degrees to 85 degrees.

It may be understood that, a positive pole/negative pole of the energy-storage apparatus may be exposed beyond the first pole through-hole, and a negative pole/positive pole of the energy-storage apparatus may be exposed beyond the second pole through-hole, so that the energy-storage apparatus may be electrically connected to another component. An explosion-proof valve of the energy-storage apparatus may be exposed beyond the first explosion-proof valve through-hole, so that when internal pressure of the energy-storage apparatus is too large, the explosion-proof valve can be lifted in a direction of the first explosion-proof valve through-hole, and the internal pressure of the energy-storage apparatus is discharged, thereby avoiding explosion of the energy-storage apparatus.

In addition, the top patch is formed by cutting a sheet. In a cutting process, a cutting tool may obliquely cut a middle part of the sheet to define a through hole with an inclined hole wall. After the sheet is obliquely cut, an edge of offcuts of the middle part of the sheet forms a sharp corner, which is convenient for an operator to separate the offcuts in a middle region of the sheet from the edge and take out the offcuts from the top patch.

Furthermore, when each of the hole wall of the first pole through-hole, the hole wall of the second pole through-hole, and the hole wall of the first explosion-proof valve through-hole is inclined relative to the connecting surface at the angle within the foregoing range, the operator can more conveniently remove offcuts in each hole from the top patch, and a removing effect is better. The top patch is unlikely to be damaged, the offcuts are completely removed, and the offcuts may not be left on an inner edge of the top patch.

Each of the hole wall of the first pole through-hole, the hole wall of the second pole through-hole, and the hole wall of the first explosion-proof valve through-hole is inclined at an angle ranging from 25 degrees to 85 degrees. In this way, each of the hole wall of the first pole through-hole, the hole wall of the second pole through-hole, and the hole wall of the first explosion-proof valve through-hole is prevented from being inclined relative to the connecting surface at an excessively large angle, and causing a width of an oblique cutting trace to be too large and an oblique cutting edge to be likely to leave a top-patch offcuts adhesive. In addition, each of the hole wall of the first pole through-hole, the hole wall of the second pole through-hole, and the hole wall of the first explosion-proof valve through-hole is prevented from being inclined relative to the connecting surface at an excessively small angle. In other words, when each of the hole wall of the first pole through-hole, the hole wall of the second pole through-hole, and the hole wall of the first explosion-proof valve through-hole is inclined relative to the connecting surface at an angle approaching 90 degrees, an obliquely-cut inclined surface may not have an inward flange, which is inconvenient for removing the offcuts. The angle at which each of the hole wall of the first pole through-hole, the hole wall of the second pole through-hole, and the hole wall of the first explosion-proof valve through-hole is inclined relative to the connecting surface is set within a reasonable range, so that the offcuts can form a convex edge, thereby facilitating removing of the offcuts.

In a possible implementation, each of the hole wall of the first pole through-hole, the hole wall of the second pole through-hole, and the hole wall of the first explosion-proof valve through-hole has a flat surface with a fixed slope; or each of the hole wall of the first pole through-hole, the hole wall of the second pole through-hole, and the hole wall of the first explosion-proof valve through-hole has a curved surface with a variable slope.

That the hole wall has a flat surface with a fixed slope means that the hole wall is in a shape of a side surface of a frustum, a hole diameter of the through hole gradually increases or decreases, and a change speed remains unchanged. That the hole wall has a surface with a variable slope means that the hole wall has a curved surface, and the change speed of the hole diameter of the through hole gradually increases or decreases.

In a possible implementation, the first hole forms a connecting through-hole between the two extension bumps. The connecting through-hole is located between the second pole through-hole and the first explosion-proof valve through-hole. The connecting through-hole communicates with the second pole through-hole and the first explosion-proof valve through-hole. A hole wall of the connecting through-hole is obliquely arranged relative to the connecting surface.

It may be understood that, an existing top patch generally defines three through holes, namely, a positive electrode through-hole, a negative electrode through-hole, and an explosion-proof valve through-hole. An area of a connection region between every two of the three through holes is relatively small. A structure of a joint between every two of the three through holes is relatively weak. In a process of removing the offcuts to form the positive electrode through-hole, the negative electrode through-hole, and the explosion-proof valve through-hole, the joint between every two through holes is likely to be broken. In embodiments of the present disclosure, the first hole is defined to communicate the second pole through-hole and the first explosion-proof valve through-hole, so that to-be-removed offcuts in the top patch may be large offcuts, which cannot only keep structural integrity of the top patch, but also effectively prevent a portion with a weak structure from being broken due to a force in the process of removing the offcuts in the top patch, and connection strength of the top patch is better.

In addition, due to the weak structure of the joint between the through holes of the top patch in the related art, deformation is likely to occur in the process of removing the offcuts, being attached to and being mounted with an end cap assembly, and the like, and consequently, the top patch cannot be kept flat, and an inner edge or outer edge of the top patch is likely to be warped. In embodiments of the present disclosure, the first hole is defined to communicate the second pole through-hole and the first explosion-proof valve through-hole, to avoid problems such as warpage of the top patch and a difficulty in a subsequent attachment and mounting process of the top patch due to deformation at a joint of each hole.

In a possible implementation, each of the two extension bumps further has a first curved surface. The hole wall of the connecting through-hole is connected to the hole wall of the second pole through-hole through the first curved surface.

It may be understood that, the hole wall of the connecting through-hole is smoothly connected to the hole wall of the second pole through-hole through the first curved surface, so that the top patch may have a relatively smooth inner edge. On one hand, the smooth inner edge can avoid scratching and wear of a wrapping film, the smooth aluminum sheet, or an electrode caused by a sharp edge when the top patch is assembled with another component of the energy-storage apparatus. On the other hand, the smooth inner edge can also make the top patch have good mounting stability, which is beneficial to avoid warpage of edges of through holes in a middle part of the top patch due to poor coordination with the smooth aluminum sheet during mounting, and an adverse effect on mounting reliability of the top patch.

In a possible implementation, a radius of curvature of the first curved surface ranges from 1 mm to 5 mm.

In a possible implementation, the first hole further includes a second curved surface, and the hole wall of the connecting through-hole is connected to the hole wall of the first explosion-proof valve through-hole through the second curved surface.

It may be understood that, the hole wall of the first explosion-proof valve through-hole of the top patch is smoothly connected to the hole wall of the connecting through-hole through the second curved surface, so that the inner edge of the top patch may not have a relatively sharp angle, thus avoiding accidental injury to operators or scratching the wrapping film and the smooth aluminum sheet due to sharp corners in a process of performing an accurate alignment operation on the top patch and the smooth aluminum sheet, and a coordination connection process between the top patch and the smooth aluminum sheet is simplified.

In a possible implementation, a radius of curvature of the second curved surface ranges from 1 mm to 5 mm.

In a possible implementation, in the width direction of the top patch, a length of each of the two extension bumps protruding relative to one side wall ranges from 0.5 mm to 5.5 mm.

It may be understood that, when an extension length of the extension bump is within the foregoing range, the extension bump may abut against a protrusion of the smooth aluminum sheet when the top patch is connected to the smooth aluminum sheet, to play a limiting role.

In a possible implementation, in the width direction of the top patch, a distance between the hole wall of the second pole through-hole and an outer edge of the top patch ranges from 2 mm to 5 mm.

It may be understood that, when a distance between an edge of the top patch and the second pole through-hole is within the foregoing range, a physical structure of the top patch is relatively stable. When the physical structure of the top patch is less than the foregoing range, the physical structure of the top patch is relatively narrow, and is likely to be broken during actual assembly with the smooth aluminum sheet.

In a possible implementation, in the width direction of the top patch, a ratio of the distance between the hole wall of the second pole through-hole and the outer edge of the top patch to a width of the second pole through-hole ranges from 1/6 to 1/4.

It may be understood that, when the ratio of the width of the second pole through-hole to the distance between the second pole through-hole and the edge of the top patch is within the foregoing range, physical structural strength of the top patch meets use requirements, and an area of the second pole through-hole is sufficient to expose the protrusion and other structures of the smooth aluminum sheet.

In a possible implementation, the connecting through-hole is an identification through-hole. An identification on the smooth aluminum sheet is exposed beyond the identification through-hole.

It may be understood that, a part of a surface of the energy-storage apparatus may also be exposed though the connecting through-hole, to set some product identifications. In addition, since the top patch is arranged around the identification, and an identification position is recessed relative to the top patch, the identification position is not likely to be scratched by foreign objects.

In a second aspect, an energy-storage apparatus is provided in the present disclosure. The energy-storage apparatus includes a smooth aluminum sheet and a top patch, where the top patch is attached to a top surface of the smooth aluminum sheet. The top patch defines a first pole through-hole and a first hole spaced apart from the first pole through-hole in a length direction of the top patch. The first hole includes two side walls arranged opposite to each other in a width direction of the top patch. Each of the two side walls is provided with an extension bump. The first hole at one side of the extension bump forms a first explosion-proof valve through-hole, and the first hole at the other side of the extension bump forms a second pole through-hole. The top patch further includes a connecting surface configured to be connected to the smooth aluminum sheet. Each of a hole wall of the first pole through-hole, a hole wall of the second pole through-hole, and a hole wall of the first explosion-proof valve through-hole is arranged obliquely relative to the connecting surface. An angle at which each of the hole wall of the first pole through-hole, the hole wall of the second pole through-hole, and the hole wall of the first explosion-proof valve through-hole is inclined relative to the connecting surface ranges from 25 degrees to 85 degrees.

In a possible implementation, the smooth aluminum sheet includes a smooth aluminum-sheet body and a negative electrode protrusion, where the negative electrode protrusion protrudes from the smooth aluminum-sheet body, and the negative electrode protrusion is exposed beyond the second pole through-hole. In a width direction of the smooth aluminum sheet, a distance between an edge of the negative electrode protrusion and an edge of the smooth aluminum-sheet body is a first distance. The distance between the hole wall of the second pole through-hole and the outer edge of the top patch is a second distance. The second distance is less than the first distance.

It may be understood that, a width of a narrowest portion of the top patch in the width direction of the smooth aluminum sheet is less than a width of the negative electrode protrusion of the smooth aluminum sheet from an outer edge of the smooth aluminum sheet. Therefore, after the top patch is attached to the smooth aluminum sheet, the top patch may not fall off because the outer edge of the top patch protrudes relative to the outer edge of the smooth aluminum sheet.

In a possible implementation, the smooth aluminum-sheet body has a first surface facing the top patch. The energy-storage apparatus further includes a wrapping film. An edge of the wrapping film covers a portion of an edge of the first surface. In the width direction of the smooth aluminum sheet, a width of the wrapping film covering the portion of the first surface is a third distance, and the second distance is greater than the third distance.

It may be understood that, in the width direction of the smooth aluminum sheet, the width of the narrowest portion of the top patch is greater than the width of the wrapping film covering the portion of the first surface of the smooth aluminum sheet. With such arrangement, the top patch can completely cover the edge of the wrapping film on the first surface of the smooth aluminum sheet, so that after the top patch is connected to the smooth aluminum sheet, warpage of a portion of the edge of the wrapping film on the surface of the smooth aluminum sheet can be avoided.

In a third aspect, an electricity-consumption device is provided in the present disclosure. The electricity-consumption device includes an energy-storage apparatus. The energy-storage apparatus includes a smooth aluminum sheet and a top patch, where the top patch is attached to a top surface of the smooth aluminum sheet. The top patch defines a first pole through-hole and a first hole spaced apart from the first pole through-hole in a length direction of the top patch. The first hole includes two side walls arranged opposite to each other in a width direction of the top patch. Each of the two side walls is provided with an extension bump. The first hole at one side of the extension bump forms a first explosion-proof valve through-hole, and the first hole at the other side of the extension bump forms a second pole through-hole. The top patch further includes a connecting surface configured to be connected to the smooth aluminum sheet. Each of a hole wall of the first pole through-hole, a hole wall of the second pole through-hole, and a hole wall of the first explosion-proof valve through-hole is arranged obliquely relative to the connecting surface. An angle at which each of the hole wall of the first pole through-hole, the hole wall of the second pole through-hole, and the hole wall of the first explosion-proof valve through-hole is inclined relative to the connecting surface ranges from 25 degrees to 85 degrees.

Referring to FIG. 1, FIG. 1 is a schematic structural diagram of an electricity-consumption device 1000 according to an embodiment of the present disclosure. The electricity-consumption device 1000 includes a power system 100 and an energy-storage apparatus 200. The power system 100 is electrically connected to the energy-storage apparatus 200. The energy-storage apparatus 200 provides a power source for the power system 100.

Descriptions are provided below by using an example in which the electricity-consumption device 1000 is a vehicle. The vehicle may be a fuel vehicle, a gas vehicle, or a new energy vehicle, where the new energy vehicle may be a pure electric vehicle, a hybrid vehicle, or an extended-range vehicle. The vehicle includes a battery, a controller, and a motor. The battery is configured to supply power to the controller and/or the motor as an operating power source and/or a driving power source of the vehicle, for example, the battery is configured for power requirements of the vehicle during startup, navigation, and operation. For example, the battery supplies power to the controller, and the controller controls the battery to supply power to the motor, and the motor receives and uses power of the battery as driving power of the vehicle, to replace or partially replace fuel oil or natural gas to provide driving power for the vehicle.

It may be understood that the energy-storage apparatus 200 may include but is not limited to a single battery, a battery module, a battery pack, a battery system, or the like. When the energy-storage apparatus 200 is a single battery, the battery may be a prismatic battery. Descriptions are provided below by using an example in which the energy-storage apparatus 200 is a prismatic battery, but it may be understood that, the energy-storage apparatus is not limited thereto.

It is to be noted that, the vehicle is only a use scenario of the energy-storage apparatus 200 provided in the present disclosure. In other scenarios, the energy-storage apparatus 200 can also be used for another electronic device or mechanical device, and is not limited to the vehicle. The energy-storage apparatus 200 of the present disclosure may also be used in a non-power system, for example, a lighting tool or charging equipment. The use scenario of the energy-storage apparatus 200 is not specifically limited in the present disclosure.

Figure 2:
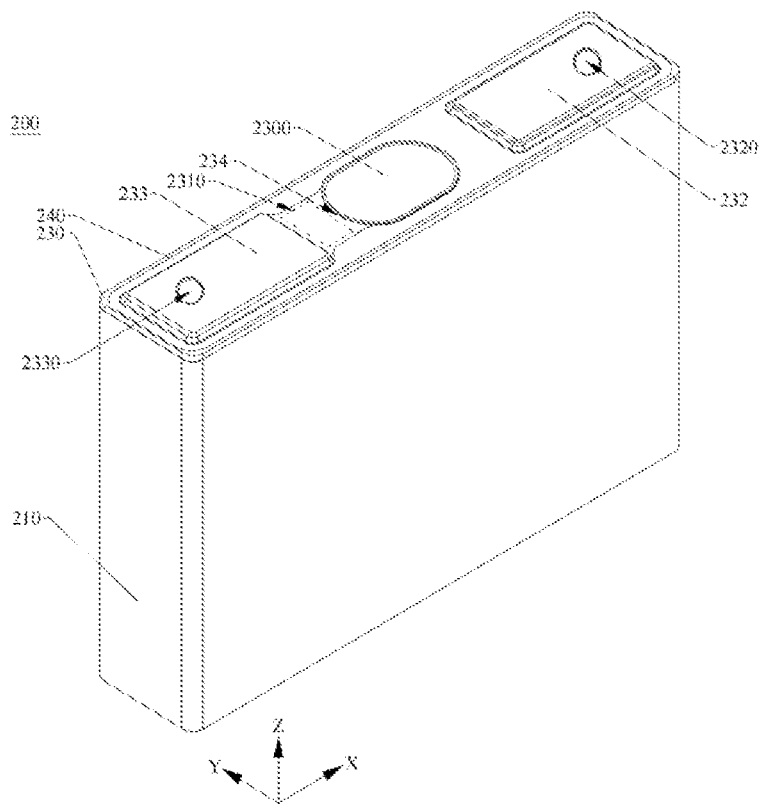
FIG. 2 is a schematic structural diagram of the energy-storage apparatus shown in FIG. 1.

Referring to FIG. 2, FIG. 2 is a schematic structural diagram of the energy-storage apparatus 200 shown in FIG. 1. For ease of description, a length direction of the energy-storage apparatus 200 shown in FIG. 2 is defined as an X-axis direction (hereinafter referred to as direction X), a width direction is defined as a Y-axis direction (hereinafter referred to as direction Y), and a height direction is defined as a Z-axis direction (hereinafter referred to as direction Z).

The energy-storage apparatus 200 includes an electrode assembly (not shown in FIG. 2), a housing 210, a smooth aluminum sheet 230, and a top patch 240. One end of the housing 210 defines an opening, and the housing 210 has an accommodating space. The electrode assembly is mounted in the accommodating space of the housing 210. The smooth aluminum sheet 230 is connected to the opening of the housing 210, and cooperates with the housing 210 to encapsulate the electrode assembly. For example, the housing 210 is a metal housing such as an aluminum housing. The housing 210 may also be made of other materials. The cell includes a positive electrode sheet, a negative electrode sheet, and a separator located between the positive electrode sheet and the negative electrode sheet. The positive electrode sheet, the separator, and the negative electrode sheet are stacked sequentially and wound to form the cell.

Figure 3:
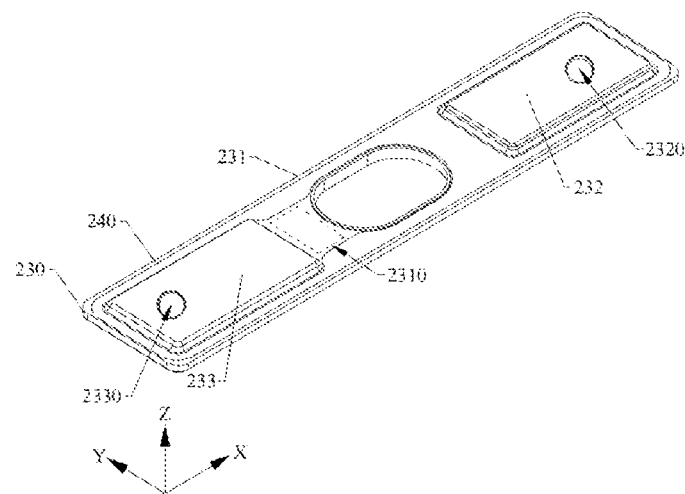
FIG. 3 is a schematic structural diagram of fitting of the smooth aluminum sheet and the top patch shown in FIG. 2.

Referring to FIG. 3, FIG. 3 is a schematic structural diagram of fitting of the smooth aluminum sheet 230 and the top patch 240 shown in FIG. 2. The energy-storage apparatus 200 further includes a positive pole (not shown in FIG. 3), a negative pole (not shown in FIG. 3), the smooth aluminum sheet 230, and the top patch 240.

The positive pole and the negative pole are arranged opposite to each other in direction X, and both the positive pole and the negative pole are electrically connected to the electrode assembly. Specifically, the positive pole is electrically connected with the positive electrode sheet in the electrode assembly to achieve the electrical connection between the positive pole and the electrode assembly, and the positive pole protrudes relative to the electrode assembly in a direction away from the electrode assembly. The negative pole is electrically connected to the negative electrode sheet in the electrode assembly to achieve the electrical connection between the negative pole and the electrode assembly, and the negative pole protrudes relative to the electrode assembly in the direction away from the electrode assembly. The positive pole and the negative pole may be used as electrode poles of the energy-storage apparatus 200, and a current in the electrode assembly flows to the positive pole, then flows to an external electricity-consumption device through the positive pole, and flows to the electrode assembly through the negative pole, thus realizing current circulation.

Figure 4:
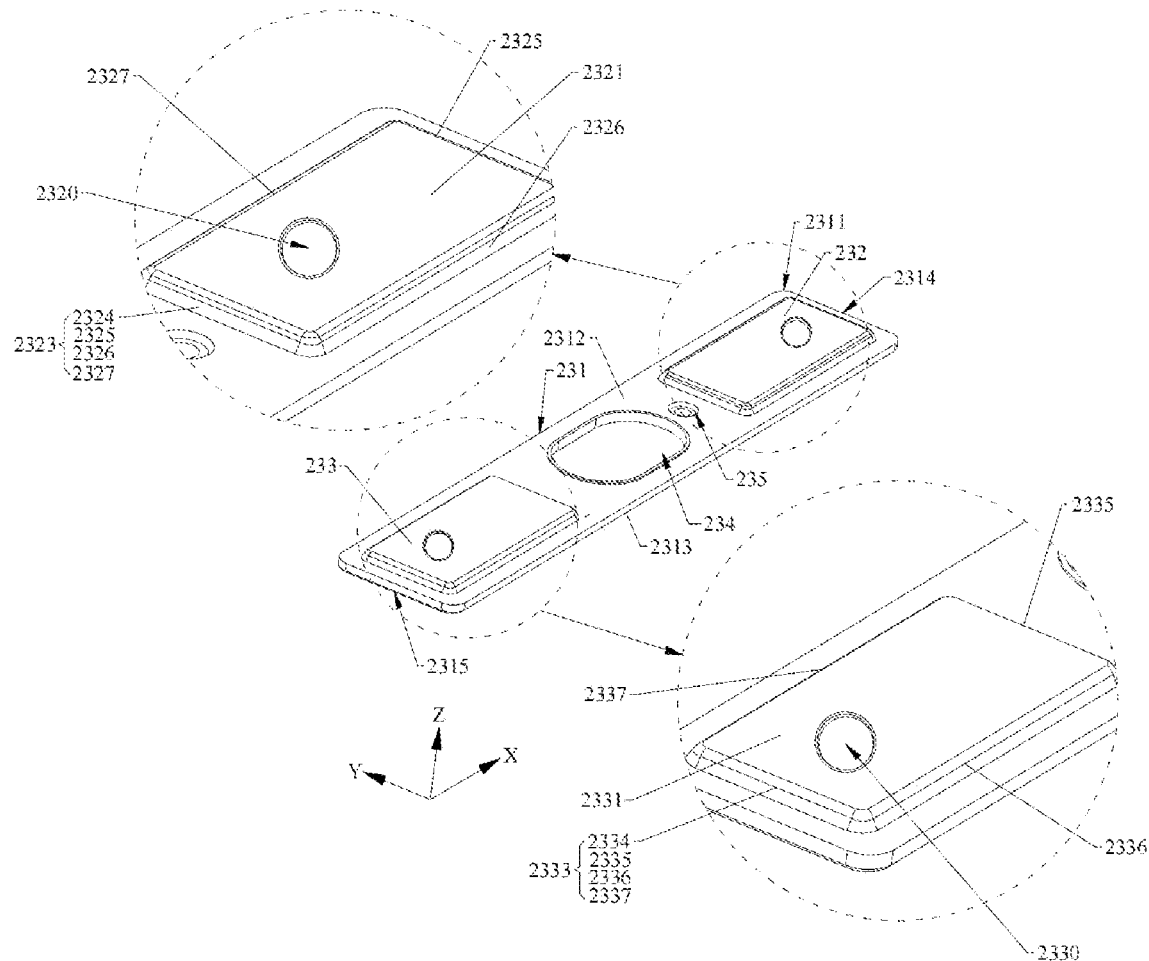
FIG. 4 is a schematic structural diagram of the smooth aluminum sheet shown in FIG. 3 at an angle.

Referring to FIG. 3 and FIG. 4, FIG. 4 is a schematic structural diagram of the smooth aluminum sheet 230 shown in FIG. 3 at an angle. The smooth aluminum sheet 230 is connected to the opening of the housing 210. For example, the smooth aluminum sheet 230 may be welded to the housing 210 to isolate the interior of the energy-storage apparatus 200 and exterior of the energy-storage apparatus 200.

The smooth aluminum sheet 230 includes a smooth aluminum-sheet body 231, a positive electrode protrusion 232, a negative electrode protrusion 233, a second explosion-proof valve through-hole 234, and a liquid-injection hole 235.

An outer contour of the smooth aluminum-sheet body 231 is rectangular in shape. The smooth aluminum-sheet body 231 includes four second outer vertex-corners 2311 that are at an outer edge of the smooth aluminum sheet 230 and that are sequentially arranged, and the four second outer vertex-corners 2311 are four corners of an outer edge of the smooth aluminum-sheet body 231.

In a possible implementation, at least one second outer vertex-corner 2311 of the four second outer vertex-corners 2311 may be a rounded corner. Descriptions are provided below by using an example in which the four second outer vertex-corners 2311 are all rounded corners, but it may be understood that, the present disclosure is not limited thereto. It may be understood that, the four second outer vertex-corners 2311 of the smooth aluminum-sheet body 231 are all configured as rounded corners, so that the smooth aluminum-sheet body 231 may have a relatively smooth outer edge. The smooth outer edge can prevent the smooth aluminum sheet 230 from scratching and wearing another component (such as a wrapping film 250) or being pierced by another component due to a sharp edge when assembled with another component (such as the top patch 240) in the energy-storage apparatus 200. The smooth outer edge can also make the smooth aluminum sheet 230 have good mounting stability, which is beneficial to avoid warpage around the smooth aluminum sheet 230 due to contact with another component in the energy-storage apparatus 200 during installation, and an adverse effect on mounting reliability of the smooth aluminum sheet 230.

For example, a corner radius of the second outer vertex-corner 2311 ranges from 2.0 mm to 3.5 mm (including endpoint values of 2.0 mm and 3.5 mm). It is to be understood that, if a corner of the second outer vertex-corner is set too large, it may result in a situation in which it is difficult to fit with the housing 210 during assembly. If the corner of the second outer vertex-corner is set too small, mounting of the top patch 240 may be adversely affected during subsequent assembly with the top patch 240. The corner radius of the second outer vertex-corner 2311 is set within this range, so that when the smooth aluminum sheet 230 meets an assembly standard, warpage around the top patch 240 that is caused by touching a sharp corner in a subsequent process and further causes the top patch 240 to fall can be avoided, and the reliability is excellent.

Still referring to FIG. 4, in embodiments of the present disclosure, the smooth aluminum-sheet body 231 has a first surface 2312 and a second surface 2313 that are opposite to each other. The first surface 2312 is a surface of the smooth aluminum-sheet body 231 facing the top patch 240, and the second surface 2313 is a surface in the smooth aluminum-sheet body 231 facing the housing 210. The smooth aluminum-sheet body 231 includes a first end 2314 and a second end 2315. The second end 2315 and the first end 2314 are arranged opposite to each other in direction X.

Figure 5:
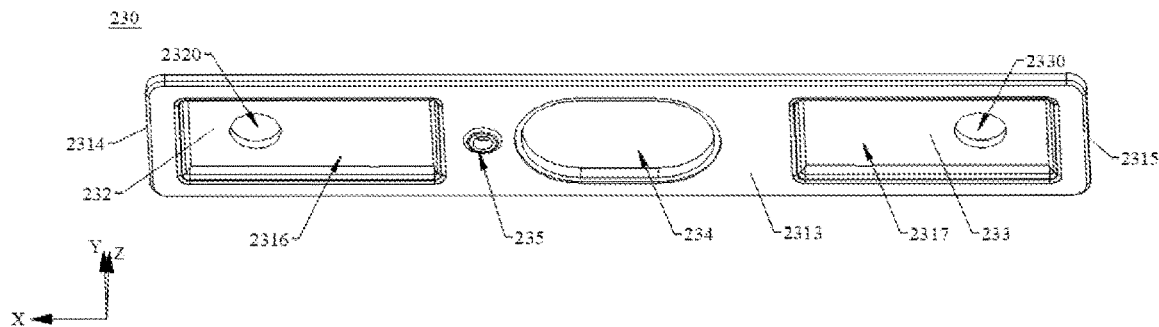
FIG. 5 is a schematic structural diagram of the smooth aluminum sheet shown in FIG. 3 at another angle.

Referring to FIG. 5, FIG. 5 is a schematic structural diagram of the smooth aluminum sheet 230 shown in FIG. 3 at another angle. The smooth aluminum-sheet body 231 defines a first cavity 2316 and a second cavity 2317. The first cavity 2316 is defined at the first end 2314, the first cavity 2316 is recessed from the second surface 2313 toward the first surface 2312, and the first cavity 2316 is configured for accommodating another component (such as a lower plastic component) in the energy-storage apparatus 200. The second cavity 2317 is defined at the second end 2315, the second cavity 2317 is recessed from the second surface 2313 toward the first surface 2312, and the second cavity 2317 is configured for accommodating another component (such as lower plastic component) in the energy-storage apparatus 200.

Figure 6:
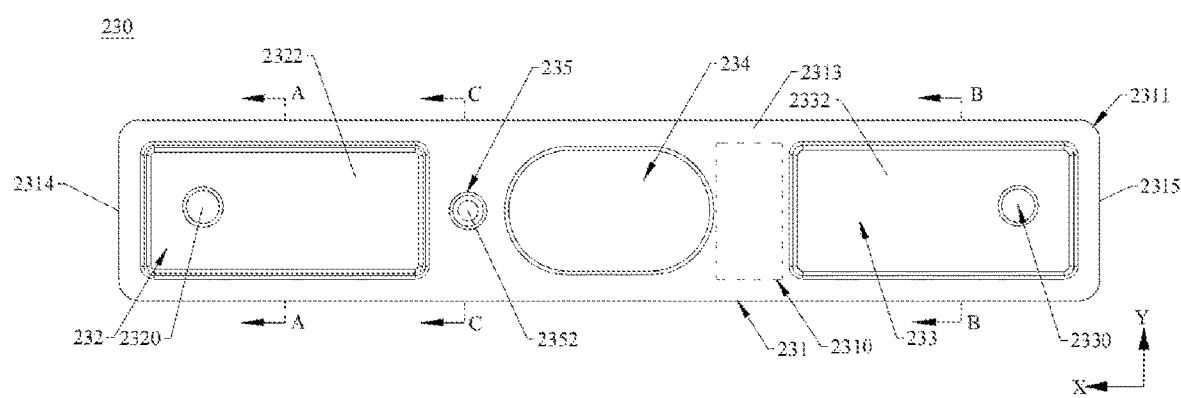
FIG. 6 is a schematic structural diagram of the smooth aluminum sheet shown in FIG. 3 at yet another angle.
Figure 7:
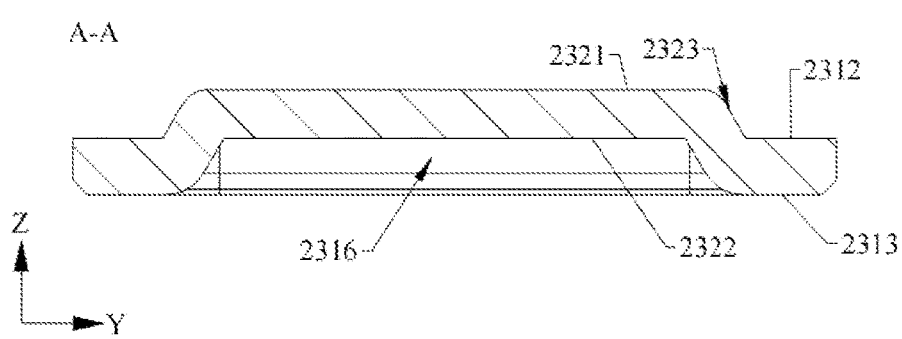
FIG. 7 is a schematic cross-sectional view of plane A-A of the smooth aluminum sheet shown in FIG. 6.

Referring to FIG. 4 and FIG. 6, FIG. 6 is a schematic structural diagram of the smooth aluminum sheet 230 shown in FIG. 3 at yet another angle. The positive electrode protrusion 232 is arranged at the first end 2314 of the smooth aluminum-sheet body 231, and the positive electrode protrusion 232 protrudes relative to the first surface 2312 of the smooth aluminum-sheet body 231. The positive electrode protrusion 232 protrudes relative to the smooth aluminum-sheet body 231, so that a good reminding effect can be achieved, and when assembling the energy-storage apparatus 200, an operator can align each component of the smooth aluminum sheet 230 to the top patch 240 without paying too much attention, which improves assembly efficiency of the energy-storage apparatus 200 and assembly accuracy of each component in the energy-storage apparatus 200. For example, an outer diameter of the positive electrode protrusion 232 gradually decreases in a direction from the first surface 2312 of the smooth aluminum-sheet body 231 to the top patch 240.

The positive electrode protrusion 232 defines a positive electrode through-hole 2320. The positive electrode through-hole 2320 extends through the positive electrode protrusion 232 in direction Z. The positive electrode through-hole 2320 is communicated with the first cavity 2316. The positive electrode through-hole 2320 is configured for the positive pole to pass through.

Referring to FIG. 4, FIG. 5, FIG. 6, and FIG. 7, FIG. 7 is a schematic cross-sectional view of plane A-A of the smooth aluminum sheet 230 shown in FIG. 6. The positive electrode protrusion 232 further has a first top-surface 2321, a first bottom-surface 2322 opposite to the first top-surface 2321, and a first peripheral-side-surface 2323.

The first top-surface 2321 is a surface of the positive electrode protrusion 232 away from the first surface 2312. The first top-surface 2321 may be rectangular. Four vertex corners of the first top-surface 2321 are rounded corners.

The first bottom-surface 2322 is a surface of the positive electrode protrusion 232 facing the housing 210, the first bottom-surface 2322 is connected to an opening of the first cavity 2316 on a side of the first surface 2312, and the first bottom-surface 2322 closes the opening. The first bottom-surface 2322 is flush with the first surface 2312 of the smooth aluminum-sheet body 231. The first bottom-surface 2322 may be rectangular. Four vertex corners of the first bottom-surface 2322 are rounded corners.

Still referring to FIG. 4 and FIG. 6, the first peripheral-side-surface 2323 connects the first surface 2312 to the first top-surface 2321. The first peripheral-side-surface 2323 may include four side surfaces, and two adjacent side surfaces are connected by using a curved surface transition. In other words, a vertex corner of an outer periphery of the positive electrode protrusion is a rounded corner. Four outer corners of the positive electrode protrusion 232 are configured as a curved surface transition, to prevent the smooth aluminum sheet 230 from scratching an operator or scratching another component (such as the wrapping film 250 covering the housing 210) due to a sharp edge when assembled with another component of the energy-storage apparatus 200. Moreover, a curved surface structure can also play a guiding role in a subsequent mounting process of the top patch 240, so that the top patch 240 can be more easily aligned with the smooth aluminum sheet 230.

For example, a radian of the curved surface ranges from 2.5 mm to 3.5 mm (including endpoint values of 2.5 mm and 3.5 mm).

Specifically, the four side surfaces of the first peripheral-side-surface 2323 may include a first side surface 2324, a second side surface 2325, a third side surface 2326, and a fourth side surface 2327. The first side surface 2324 and the second side surface 2325 are arranged opposite to each other in direction X. The third side surface 2326 and the fourth side surface 2327 are arranged opposite to each other in direction Y. The first side surface 2324, the third side surface 2326, the second side surface 2325, and the fourth side surface 2327 are sequentially connected to form the first peripheral-side-surface 2323 of the positive electrode protrusion 232. Since four vertex corners of the first top-surface 2321 and four vertex corners of the first bottom-surface 2322 are all rounded corners, the first side surface 2324 is smoothly connected to the third side surface 2326 by using a curved surface, the third side surface 2326 is smoothly connected to the second side surface 2325 by using a curved surface, the second side surface 2325 is smoothly connected to the fourth side surface 2327 by using a curved surface, and the fourth side surface 2327 is smoothly connected to the first side surface 2324 by using a curved surface.

Still referring to FIG. 4 and FIG. 6, the negative electrode protrusion 233 is arranged at the second end 2315 of the smooth aluminum-sheet body 231, and the negative electrode protrusion 233 protrudes relative to the first surface 2312 of the smooth aluminum-sheet body 231. The negative electrode protrusion 233 protrudes relative to the smooth aluminum-sheet body 231, so that a good reminding effect can be achieved, and when assembling the energy-storage apparatus 200, an operator can align each component of the smooth aluminum sheet 230 to the top patch 240 without paying too much attention, which improves assembly efficiency of the energy-storage apparatus 200 and assembly accuracy of each component in the energy-storage apparatus 200. For example, an outer diameter of the negative electrode protrusion 233 gradually decreases in the direction from the first surface 2312 of the smooth aluminum-sheet body 231 to the top patch 240.

The negative electrode protrusion 233 defines a negative electrode through-hole 2330. The negative electrode through-hole 2330 extends through the negative electrode protrusion 233 in direction Z. The negative electrode through-hole 2330 is communicated with the second cavity 2317. The negative electrode through-hole 2330 is configured for the negative pole to pass through.

Figure 8:
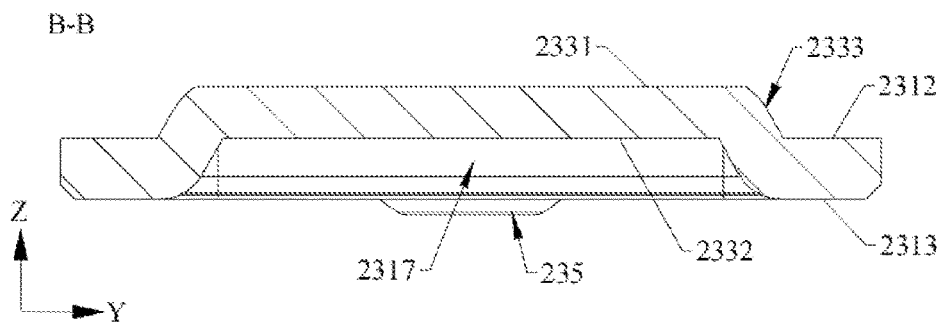
FIG. 8 is a schematic cross-sectional view of plane B-B of the smooth aluminum sheet shown in FIG. 6.

Referring to FIG. 4, FIG. 6, and FIG. 8, FIG. 8 is a schematic cross-sectional view of plane B-B of the smooth aluminum sheet 230 shown in FIG. 6. The negative electrode protrusion 233 further has a second top-surface 2331, a second bottom-surface 2332 opposite to the second top-surface 2331, and a second peripheral-side-surface 2333.

The second top-surface 2331 is a surface of the negative electrode protrusion 233 away from the first surface 2312. The second top-surface 2331 may be rectangular. Four vertex corners of the second top-surface 2331 are rounded corners.

The second bottom-surface 2332 is a surface of the negative electrode protrusion 233 facing the housing 210, the second bottom-surface 2332 is connected to an opening of the second cavity 2317 on the side of the first surface 2312, and the second bottom-surface 2332 closes the opening. The second bottom-surface 2332 is flush with the first surface 2312 of the smooth aluminum-sheet body 231. The second bottom-surface 2332 may be rectangular. Four vertex corners of the second bottom-surface 2332 are rounded corners.

Referring to FIG. 4 and FIG. 6 again, the second peripheral-side-surface 2333 connects the first surface 2312 to the second top-surface 2331. The second peripheral-side-surface 2333 may include four side surfaces, and two adjacent side surfaces are connected by using a curved surface transition. In other words, a vertex corner of an outer peripheral edge of the negative electrode protrusion 233 is a rounded corner. Four outer corners of the negative electrode protrusion 233 are configured as a curved surface transition, to prevent the smooth aluminum sheet 230 from scratching an operator or scratching another component (such as the wrapping film 250 covering the housing 210) due to a sharp edge when assembled with another component of the energy-storage apparatus 200. Moreover, a curved surface structure can also play a guiding role in a subsequent mounting process of the top patch 240, so that the top patch 240 can be more easily aligned with the smooth aluminum sheet 230.

For example, a radian of the curved surface ranges from 2.5 mm to 3.5 mm (including endpoint values of 2.5 mm and 3.5 mm).

Specifically, the four side surfaces of the second peripheral-side-surface 2333 may include a fifth side surface 2334, a sixth side surface 2335, a seventh side surface 2336, and an eighth side surface 2337. The fifth side surface 2334 and the sixth side surface 2335 are arranged opposite to each other in direction X. The seventh side surface 2336 and the eighth side surface 2337 are arranged opposite to each other in direction Y. The fifth side surface 2334, the seventh side surface 2336, the sixth side surface 2335, and the eighth side surface 2337 are sequentially connected form the second peripheral-side-surface 2333 of the negative electrode protrusion 233. Since four vertex corners of the second top-surface 2331 and four vertex corners of the second bottom-surface 2332 are all rounded corners, the fifth side surface 2334 is smoothly connected to the seventh side surface 2336 by using a curved surface, the seventh side surface 2336 is smoothly connected to the sixth side surface 2335 by using a curved surface, the sixth side surface 2335 is smoothly connected to the eighth side surface 2337 by using a curved surface, and the eighth side surface 2337 is smoothly connected to the fifth side surface 2334 by using a curved surface.

The second explosion-proof valve through-hole 234 is between the positive electrode protrusion 232 and the negative electrode protrusion 233. The second explosion-proof valve through-hole 234, the positive electrode protrusion 232, and the negative electrode protrusion 233 are arranged at intervals. The second explosion-proof valve through-hole 234 extends through the smooth aluminum-sheet body 231 of the smooth aluminum sheet 230 in direction Z. The second explosion-proof valve through-hole 234 is configured to connect an explosion-proof valve of the energy-storage apparatus 200.

Figure 9:
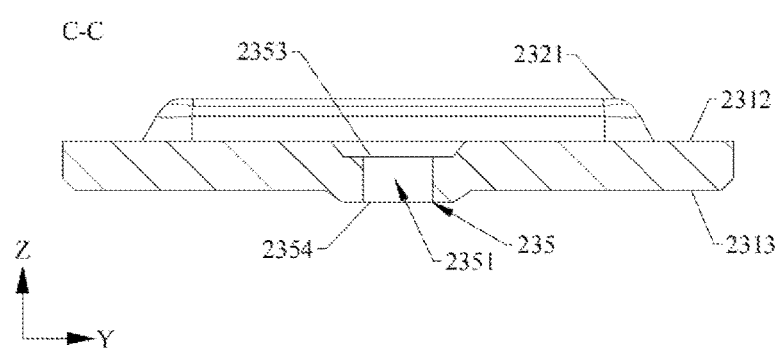
FIG. 9 is a schematic cross-sectional view of plane C-C of the smooth aluminum sheet shown in FIG. 6.

Referring to FIG. 5 and FIG. 9, FIG. 9 is a schematic cross-sectional view of plane C-C of the smooth aluminum sheet 230 shown in FIG. 6. The liquid-injection hole 235 is located between the positive electrode protrusion 232 and the second explosion-proof valve through-hole 234, and the liquid-injection hole 235, the positive electrode protrusion 232, and the second explosion-proof valve through-hole 234 are arranged at intervals.

The liquid-injection hole 235 may be a blind hole. As shown in FIG. 9, the liquid-injection hole 235 is in an open state when the energy-storage apparatus 200 is not assembled, and the liquid-injection hole 235 is a through hole 2351. The through hole 2351 extends through the smooth aluminum-sheet body 231 in direction Z. As shown in FIG. 6, the through hole 2351 is connected to a sealing member 2352 after the energy-storage apparatus 200 is assembled. The sealing member 2352 seals the through hole 2351 to form the liquid-injection hole 235 that is recessed relative to the first surface 2312. The liquid-injection hole 235 has a liquid-injection-hole top-surface 2353 and a liquid-injection-hole bottom-surface 2354 opposite to the liquid-injection-hole top-surface 2353 in an opposite direction of direction Z. The liquid-injection-hole top-surface 2353 is recessed relative to the first surface 2312, and the liquid-injection-hole bottom-surface 2354 may protrude relative to the second surface 2313.

Since the liquid-injection hole 235 is recessed relative to the first surface 2312, and a recessed direction of the liquid-injection hole 235 is opposite to a protruding direction of the positive electrode protrusion 232 and a protruding direction of the negative electrode protrusion 233. Therefore, after liquid injection into the through hole 2351 is completed and the sealing member 2352 is welded to the through hole 2351 to form the liquid-injection hole 235, the liquid-injection hole 235 may not protrude relative to the first surface 2312 of the smooth aluminum-sheet body 231. In this arrangement, the smooth aluminum-sheet body 231 has good flatness, so that when the top patch 240 is subsequently mounted, the top patch 240 may be flush with and attached to the first surface 2312 of the smooth aluminum-sheet body 231, the top patch 240 will not be unable to be flush with and attached to the first surface 2312 of the smooth aluminum-sheet body 231 due to the protrusion on the first surface 2312, and the top patch 240 is unlikely to be fallen off from the smooth aluminum sheet 230.

For example, the liquid-injection hole 235 is recessed relative to the first surface 2312 at a distance ranging from 0.7 mm to 1.0 mm (including endpoint values of 0.7 mm and 1.0 mm).

Figure 10:
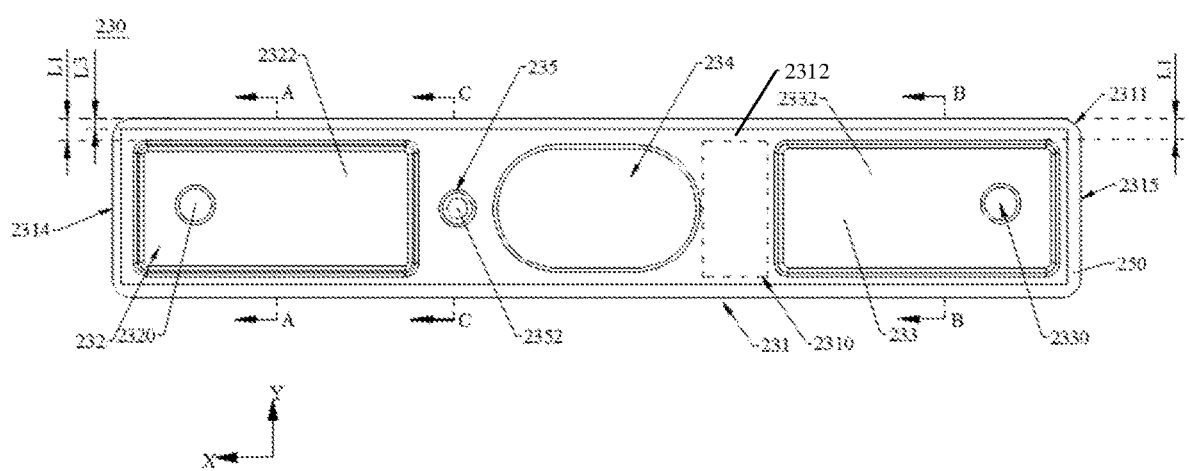
FIG. 10 is a schematic top view of fitting of the smooth aluminum sheet shown in FIG. 6 and a wrapping film.

Referring to FIG. 10, FIG. 10 is a schematic top view of fitting of the smooth aluminum sheet 230 shown in FIG. 6 and a wrapping film 250. The energy-storage apparatus 200 may further include a wrapping film 250. The wrapping film 250 may be attached to an outer surface of the housing 210, thereby protecting the housing 210 of the energy-storage apparatus 200 and internal components of the housing 210. The wrapping film 250 covers the housing, and an edge of the wrapping film 250 covers an edge of a portion of the smooth aluminum sheet 230.

In the width direction (that is, direction Y) of the smooth aluminum sheet 230, a distance between the negative electrode protrusion 233 and the outer edge of the smooth aluminum-sheet body 231 may be a first distance L1, and a width of the wrapping film 250 covering a portion of the first surface 2312 of the smooth aluminum-sheet body 231 may be a third distance L3.

It is to be noted that, the distance between the negative electrode protrusion 233 and the outer edge of the smooth aluminum sheet 230 may be the same as or different from a distance between the positive electrode protrusion 232 and the outer edge of the smooth aluminum sheet 230.

Figure 11:
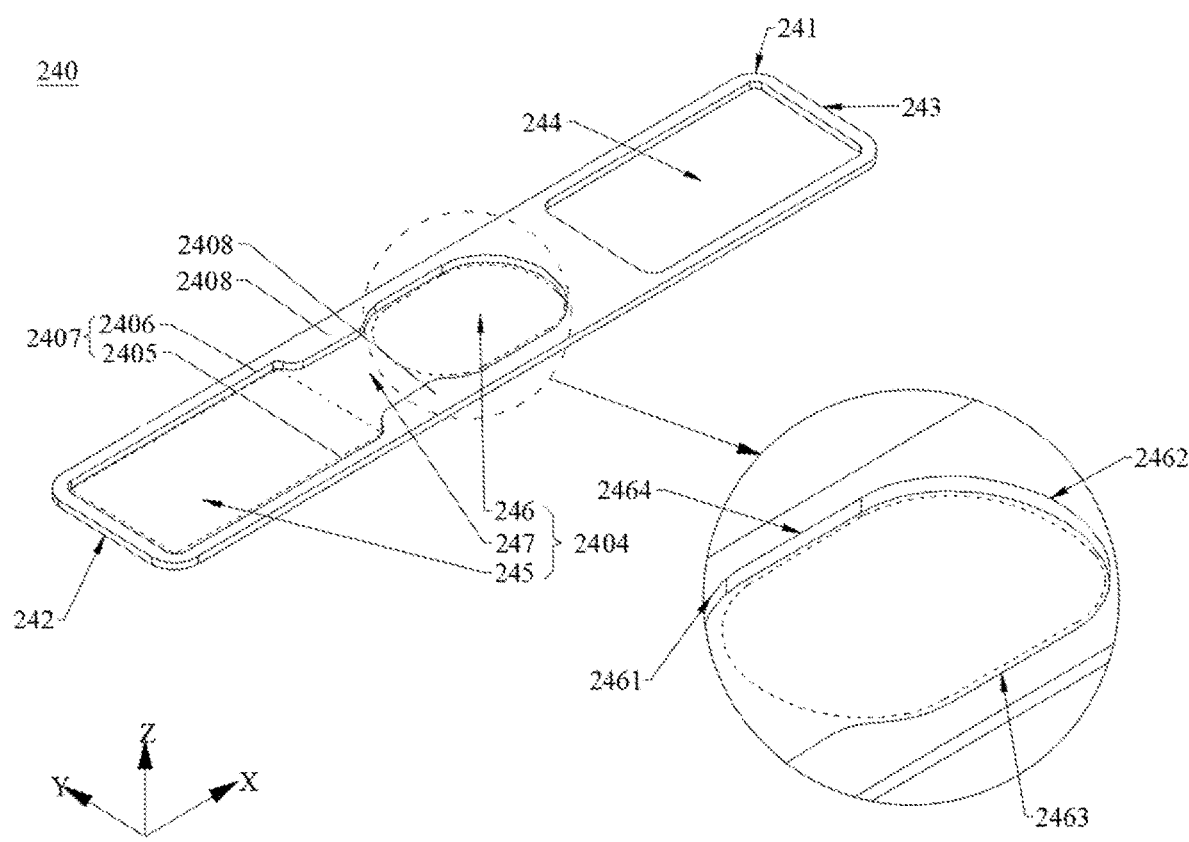
FIG. 11 is a schematic structural diagram of the top patch shown in FIG. 3.
Figure 12:
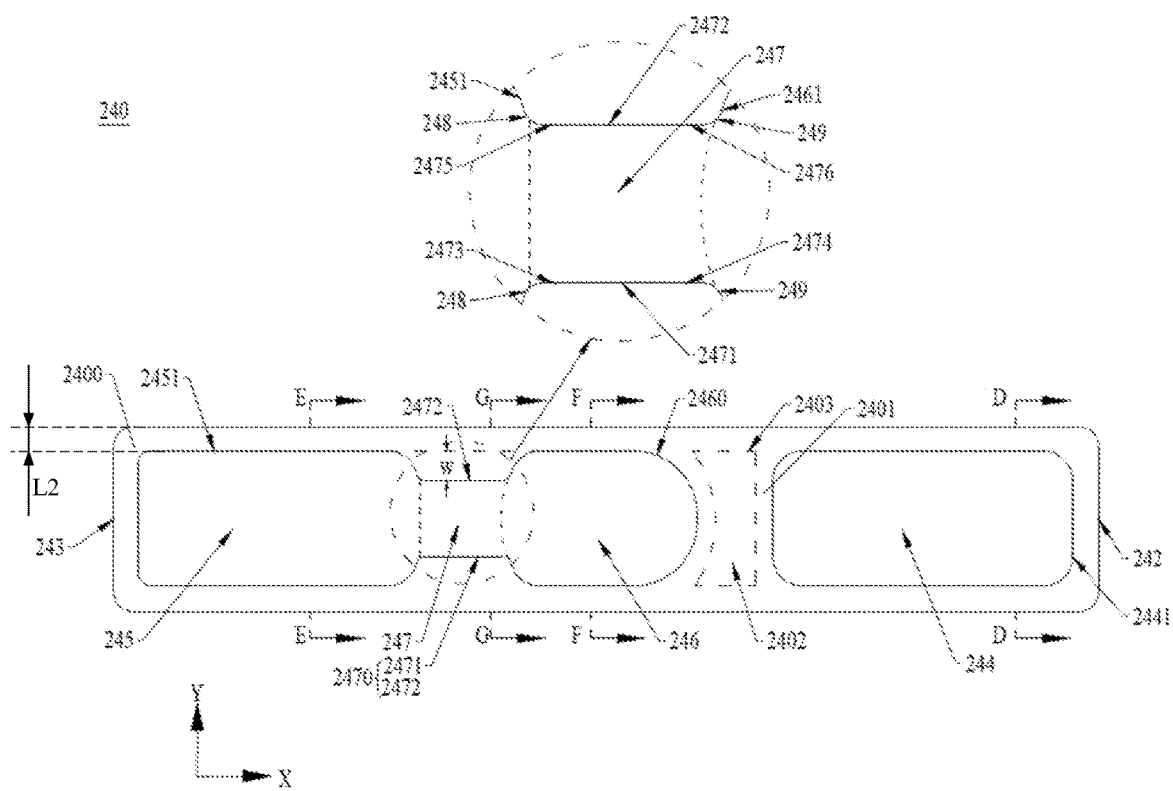
FIG. 12 is a schematic top view of the top patch shown in FIG. 11.

Referring to FIG. 3, FIG. 11, and FIG. 12, FIG. 11 is a schematic structural diagram of the top patch 240 shown in FIG. 3, and FIG. 12 is a schematic top view of the top patch 240 shown in FIG. 11.

The top patch 240 is attached to a top end of the smooth aluminum sheet 230. The top patch 240 has a connecting surface 2400. The connecting surface 2400 of the top patch 240 is connected to the first surface 2312 of the smooth aluminum sheet 230. The top patch 240 may be an insulator. On one hand, the top patch 240 may be disposed to achieve an insulation effect, to prevent the energy-storage apparatus 200 from being short-circuited with another circuit. On the other hand, the smooth aluminum sheet 230 of the energy-storage apparatus 200 can be protected to prevent the smooth aluminum sheet 230 from being directly impacted by an external force and being damaged.

The top patch 240 is rectangular. A shape of the top patch 240 may be the same as a shape of the smooth aluminum sheet 230. The top patch 240 includes four first outer vertex-corners 241 that are located at the outer edge of the top patch 240 and that are sequentially arranged, and the four first outer vertex-corners 241 are four corners of an outer edge of the top patch 240.

In a possible implementation, at least one first outer vertex-corner 241 in the four first outer vertex-corners 241 is a rounded corner. Descriptions are provided below by using an example in which the four first outer vertex-corners 241 are all rounded corners, but it may be understood that, the present disclosure is not limited thereto. It may be understood that, the four first outer vertex-corners 241 of the top patch 240 are all configured as rounded corners, so that the top patch 240 may have a relatively smooth outer edge. On one hand, the smooth outer edge can prevent the top patch 240 from scratching another component, being pierced by another component or scratching operators due to a sharp edge when assembled with another component (such as the wrapping film 250 covering the housing 210) of the energy-storage apparatus 200. On the other hand, the smooth outer edge can also make the top patch 240 have good mounting stability, which is beneficial to avoid warpage around the top patch 240 due to contact with another component in the energy-storage apparatus 200 during installation, and an adverse effect on mounting reliability of the top patch 240. For example, a corner radius of the first outer vertex-corner 241 may range from 2.0 mm to 3.5 mm (including endpoint values of 2.0 mm and 3.5 mm).

In this implementation, the corner radius of the first outer vertex-corner 241 of the top patch 240 may be greater than the corner radius of the second outer vertex-corner 2311 of the smooth aluminum sheet 230. In addition, a straight edge of an outer contour of the top patch 240 may be flush with a straight edge of an outer contour of the smooth aluminum sheet 230 in direction Y. Alternatively, the straight edge of the outer contour of the top patch 240 may be recessed relative to the outer contour of the smooth aluminum sheet 230 in direction Y. In other words, in direction Y, two straight edges of the top patch 240 may be between two straight edges of the aluminum sheet 230.

It may be understood that, since the top patch 240 and the smooth aluminum sheet 230 are both rectangular, a center angle corresponding to the first outer vertex-corner 241 of the top patch 240 and a center angle corresponding to the second outer vertex-corner 2311 of the smooth aluminum sheet 230 are both 90 degrees. When the corner radius of the first outer vertex-corner 241 is greater than the corner radius of the second outer vertex-corner 2311, a vertex corner of the top patch 240 is inwardly contracted relative to the smooth aluminum sheet 230, and the top patch 240 is completely located on a surface of the smooth aluminum sheet 230. In other words, the top patch 240 may not exceed relative to the edge of the smooth aluminum sheet 230, thereby preventing the top patch 240 from being removed from the smooth aluminum sheet 230 or preventing the vertex corner of the top patch 240 from warping relative to the smooth aluminum sheet 230.

Still referring to FIG. 11 and FIG. 12, the top patch 240 includes a third end 242 and a fourth end 243. The fourth end 243 and the third end 242 are arranged opposite to each other in direction X. The top patch 240 further defines a first pole through-hole 244 and a first hole 2404. The first hole 2404 includes two side walls 2407 arranged opposite to each other in direction Y. The two side walls 2407 are respectively a first wall 2405 and a second wall 2406. Each of two side walls 2407 is provided with an extension bump 2408, and extension bumps 2408 of the two side walls 2407 are arranged opposite to each other. The first hole 2404 at one side of the extension bump 2408 forms a first explosion-proof valve through-hole 246, and the first hole 2404 at the other side of the extension bump 2408 forms a second pole through-hole 245. A connecting through-hole 247 is defined between the two extension bumps 2408. The extension bump 2408 further has a first curved surface 248 and a second curved surface 249. One of the positive electrode protrusion 232 or the negative electrode protrusion 233 of the smooth aluminum sheet 230 may be exposed beyond the first pole through-hole 244, and the other of the positive electrode protrusion 232 or the negative electrode protrusion 233 of the smooth aluminum sheet 230 may be exposed beyond the second pole through-hole 245.

For example, in a width direction of the top patch 240, a length (W) of the extension bumps 2408 protruding relative to the side wall 2407 ranges from 0.5 mm to 5.5 mm (including endpoint values of 0.5 mm and 5.5 mm). A distance between an edge of the top patch 240 and the second pole through-hole 245 ranges from 2 mm to 5 mm (including end point values of 2 mm and 5 mm). In addition, a ratio of a width of the second pole through-hole 245 to a distance L2 between a hole wall 2451 of the second pole through-hole 245 and the outer edge of the top patch 240 may range from 1/6 to 1/4 (including end point values of 1/6 and 1/4).

In a possible implementation, the positive electrode protrusion 232 of the smooth aluminum sheet 230 is exposed beyond the first pole through-hole 244, and the negative electrode protrusion 233 of the smooth aluminum sheet 230 is exposed beyond the second pole through-hole 245. The first curved surface 248 connects the hole wall 2451 of the second pole through-hole 245 to a hole wall 2470 of the connecting through-hole 247. The second curved surface 249 connects a hole wall 2460 of the first explosion-proof valve through-hole 246 to the hole wall 2470 of the connecting through-hole 247. Descriptions are provided below by using this implementation as an example, but it may be understood that, the present disclosure is not limited thereto.

The first pole through-hole 244 is defined at the third end 242 of the top patch 240. The first pole through-hole 244 is rectangular, and four vertex corners of the first pole through-hole 244 are rounded corners. A shape of the first pole through-hole 244 may be the same as a shape of the first bottom-surface 2322 of the positive electrode protrusion 232, and a corner of the first pole through-hole 244 may be greater than or equal to a corner of the first bottom-surface 2322 of the positive electrode protrusion 232, so that the first pole through-hole 244 can be smoothly sheathed on a peripheral side of the positive electrode protrusion 232, and the positive electrode protrusion 232 of the smooth aluminum sheet 230 is exposed beyond the first pole through-hole 244. The first pole through-hole 244 is configured to accommodate the positive electrode protrusion 232. When the top patch 240 is attached to the smooth aluminum sheet 230, the positive electrode protrusion 232 of the smooth aluminum sheet 230 exceeds relative to the top patch 240.

In a possible implementation, there may be a certain gap between a hole wall 2441 of the first pole through-hole 244 and the peripheral side of the positive electrode protrusion 232, so that the first pole through-hole 244 can be smoothly sheathed on the peripheral side of the positive electrode protrusion 232 even if there is a certain machining error.

Figure 13:
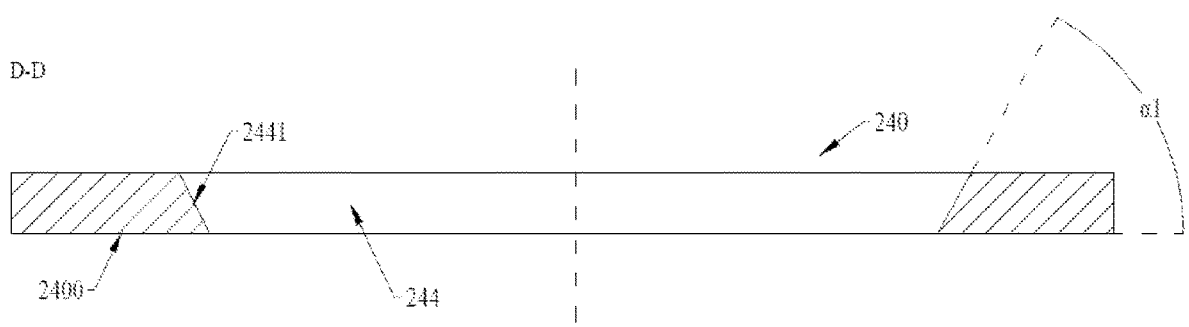
FIG. 13 is a possible schematic cross-sectional view of the top patch shown in FIG. 12 on plane D-D.

Referring to FIG. 12 and FIG. 13, FIG. 13 is a possible schematic cross-sectional view of the top patch 240 shown in FIG. 12 on plane D-D. The hole wall 2441 of the first pole through-hole 244 is obliquely arranged relative to the connecting surface 2400. In other words, a hole diameter of the first pole through-hole 244 gradually changes in a direction from the connecting surface 2400 and away from the connecting surface 2400. For example, as shown in FIG. 13, the hole diameter of the first pole through-hole 244 gradually increases in the direction from the connecting surface 2400 and away from the connecting surface 2400.

It may be understood that, the first pole through-hole 244 is defined after cutting a sheet of the top patch 240. In the cutting process, a cutting tool may obliquely cut a corresponding position of the first pole through-hole 244 of the sheet to define the first pole through-hole 244 with the hole wall 2441 of the first pole through-hole 244 arranged obliquely. After the sheet is obliquely cut, edges of offcuts inside the first pole through-hole 244 forms a sharp corner, which facilitates an operator to separate the offcuts from the edge and take out the offcuts from top patch 240, thereby saving machining time costs of the top patch 240. For example, the cutting of the top patch 240 in the present disclosure may be in a form of laser cutting or physical blanking.

An angle α1 at which the hole wall 2441 of the first pole through-hole 244 is inclined relative to the connecting surface 2400 ranges from 25 degrees to 85 degrees. On one hand, the hole wall 2441 of the first pole through-hole 244 is prevented from being inclined relative to the connecting surface 2400 at an excessively large angle α1, and causing a width of an oblique cutting trace to be too large and an oblique cutting edge to be likely to leave a top-patch offcuts adhesive. On the other hand, when the angle α1 at which the hole wall 2441 of the first pole through-hole 244 is inclined relative to the connecting surface 2400 is too small, that is, when the angle α1 at which the hole wall 2441 of the first pole through-hole 244 is inclined relative to the connecting surface 2400 approaches 90 degrees, an obliquely-cut inclined surface may not have an inward flange, which is inconvenient for removing the offcuts. The angle α1 at which the hole wall 2441 of the first pole through-hole 244 is inclined relative to the connecting surface 2400 is set within a reasonable range, so that the offcuts can form a convex edge, thereby facilitating removing of the offcuts. It is to be noted that, the angle α1 at which the hole wall 2441 of the first pole through-hole 244 is inclined relative to the connecting surface 2400 is a largest angle among angles between a tangent of any point of the first pole through-hole 244 and the connecting surface 2400.

It may be understood that, when the angle α1 is within the foregoing range, the operator can more conveniently remove the offcuts in the first pole through-hole 244 from the top patch 240, and the removing effect is better, the top patch 240 is unlikely to be damaged, the offcuts are completely removed, and the offcuts may not be left on an inner edge of the top patch 240.

In a possible implementation, referring to FIG. 13 again, the hole wall 2441 of the first pole through-hole 244 may have a flat surface with a fixed slope. That the hole wall 2441 of the first pole through-hole 244 has a flat surface with a fixed slope means that the hole wall 2441 of the first pole through-hole 244 is in a shape of a side surface of a frustum, a hole diameter of the first pole through-hole 244 gradually increases or decreases, and a change speed remains unchanged.

It may be understood that, when the hole wall 2441 of the first pole through-hole 244 has a flat surface with a fixed slope, there is no need to adjust an angle between a machining tool and the connecting surface 2400 during machining, the machining tool is less required, and machining accuracy is easy to meet requirements, thereby saving machining costs of the top patch 240 and improving a yield of the top patch 240.

In another possible implementation, the hole wall 2441 of the first pole through-hole 244 may be a surface with a variable slope. That the hole wall 2441 of the first pole through-hole 244 has a surface with a variable slope means that the hole wall has a curved surface, and the change speed of the hole diameter of the first pole through-hole 244 gradually increases or decreases.

Figure 14:
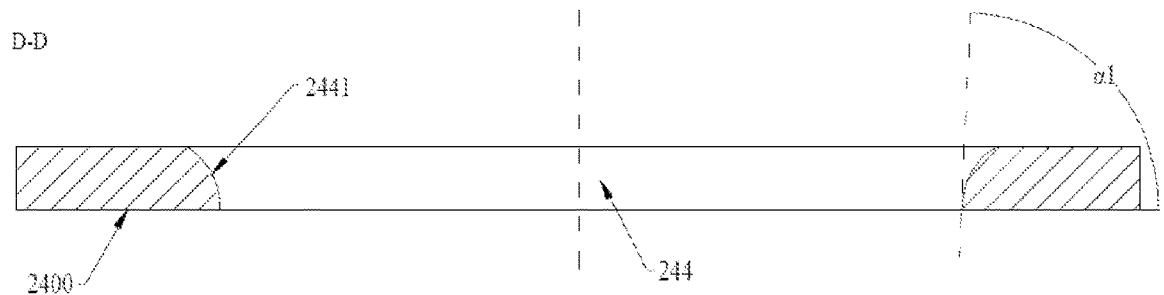
FIG. 14 is another possible schematic cross-sectional view of the top patch shown in FIG. 12 on plane D-D.
Figure 15:
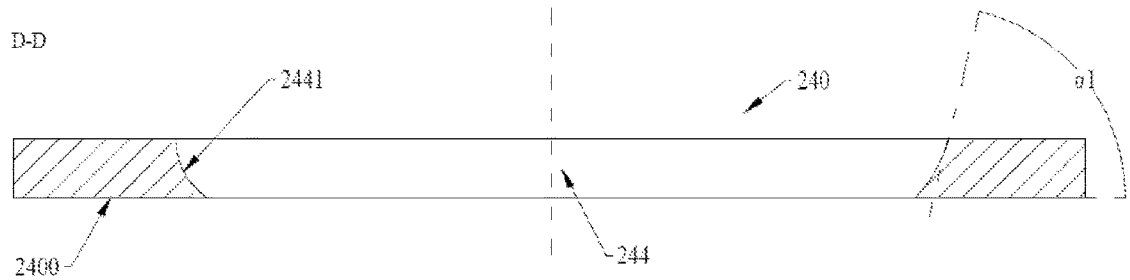
FIG. 15 is yet another possible schematic cross-sectional view of the top patch shown in FIG. 12 on plane D-D.

Specifically, referring to FIG. 14, FIG. 14 is another possible schematic cross-sectional view of the top patch 240 shown in FIG. 12 on plane D-D. The change speed of the hole diameter of the first pole through-hole 244 gradually increases, that is, the hole wall 2441 of the first pole through-hole 244 protrudes toward a center line of the first pole through-hole 244. Alternatively, referring to FIG. 15, FIG. 15 is yet another possible schematic cross-sectional view of the top patch 240 shown in FIG. 12 on plane D-D. The change speed of the hole diameter of the first pole through-hole 244 gradually decreases, that is, the hole wall 2441 of the first pole through-hole 244 is recessed away from a center line of the first pole through-hole 244.

It may be understood that, that the hole wall 2441 of the first pole through-hole 244 is a surface with a variable slope may be adapted for more use scenarios, and this is not strictly limited in embodiments of the present disclosure.

The second pole through-hole 245 is defined at the fourth end 243 of the top patch 240. The second pole through-hole 245 is rectangular, and four vertex corners of the second pole through-hole 245 are rounded corners. A shape of the second pole through-hole 245 may be the same as a shape of the second bottom-surface 2332 of the negative electrode protrusion 233, and a corner of the second pole through-hole 245 may be greater than or equal to a corner of the second bottom-surface 2332 of the negative electrode protrusion 233, so that the second pole through-hole 245 can be smoothly sheathed on a peripheral side of the negative electrode protrusion 233, and the negative electrode protrusion 233 of the smooth aluminum sheet 230 is exposed beyond the second pole through-hole 245. The second pole through-hole 245 is configured to accommodate the negative electrode protrusion 233. When the top patch 240 is attached to the smooth aluminum sheet 230, the negative electrode protrusion 233 of the smooth aluminum sheet 230 exceeds relative to the top patch 240.

In a possible implementation, there may be a certain gap between a hole wall 2451 of the second pole through-hole 245 and the peripheral side of the negative electrode protrusion 233, so that the second pole through-hole 245 can be smoothly sheathed on the peripheral side of the negative electrode protrusion 233 even if there is a certain machining error.

It may be understood that, since the positive electrode protrusion 232 and the negative electrode protrusion 233 are protruded relative to the first surface 2312, the first pole through-hole 244 and the second pole through-hole 245 may be mounted in alignment with the positive electrode protrusion 232 and the negative electrode protrusion 233 in a process of mounting the top patch 240. The first peripheral-side-surface 2323 of the positive electrode protrusion 232 and the second peripheral-side-surface 2333 of the negative electrode protrusion 233 may guide the mounting process of the top patch 240. In addition, since vertex corners of the positive electrode protrusion 232 and the negative electrode protrusion 233 are both rounded corners, during mounting, the smooth aluminum sheet 230 does not have a sharp structure and may not scratch an operator or another component of the energy-storage apparatus 200.

Figure 16:
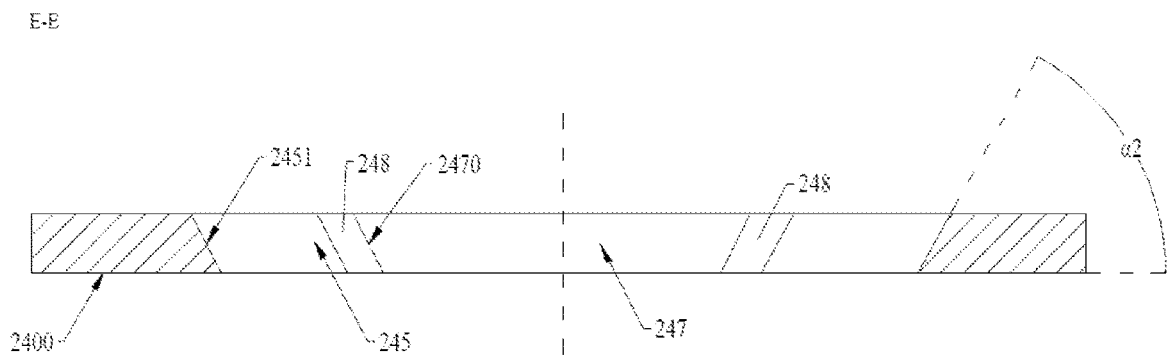
FIG. 16 is a possible schematic cross-sectional view of the top patch shown in FIG. 12 on plane E-E.

Referring to FIG. 12 and FIG. 16, FIG. 16 is a possible schematic cross-sectional view of the top patch 240 shown in FIG. 12 on plane E-E. The hole wall 2451 of the second pole through-hole 245 is obliquely arranged relative to the connecting surface 2400. In other words, a diameter of the second pole through-hole 245 gradually changes in a direction from the connecting surface 2400 and away from the connecting surface 2400. For example, as shown in FIG. 16, the hole diameter of the second pole through-hole 245 gradually increases in the direction from the connecting surface 2400 and away from the connecting surface 2400.

It may be understood that, the second pole through-hole 245 is defined after cutting a sheet of the top patch 240. In the cutting process, a cutting tool may obliquely cut a corresponding position of the second pole through-hole 245 of the sheet, so that the hole wall 2451 of the second pole through-hole 245 is obliquely arranged. After the sheet is obliquely cut, edges of offcuts inside the second pole through-hole 245 define a sharp corner, which facilitates an operator to separate the offcuts from the edge and take out the offcuts from top patch 240, thereby saving machining time costs of the top patch 240. For example, the cutting of the top patch 240 in the present disclosure may be in a form of laser cutting or physical blanking.

An angle α2 at which the hole wall 2451 of the second pole through-hole 245 is inclined relative to the connecting surface 2400 ranges from 25 degrees to 85 degrees. On one hand, the hole wall 2451 of the second pole through-hole 245 is prevented from being inclined relative to the connecting surface 2400 at an excessively large angle α2, and causing a width of an oblique cutting trace to be too large and an oblique cutting edge to be likely to leave a top-patch offcuts adhesive. On the other hand, when the angle α2 at which the hole wall 2451 of the second pole through-hole 245 is inclined relative to the connecting surface 2400 is too small, that is, when the angle α2 at which the hole wall 2451 of the second pole through-hole 245 is inclined relative to the connecting surface 2400 approaches 90 degrees, an obliquely-cut inclined surface may not have an inward flange, which is inconvenient for removing the offcuts. The angle α2 at which the hole wall 2451 of the second pole through-hole 245 is inclined relative to the connecting surface 2400 is set within a reasonable range, so that the offcuts can form a convex edge, thereby facilitating removing of the offcuts. It is to be noted that, the angle α2 at which the hole wall 2451 of the second pole through-hole 245 is inclined relative to the connecting surface 2400 is a largest angle among angles between a tangent of any point of the second pole through-hole 245 and the connecting surface 2400.

It may be understood that, when the angle α2 is within the foregoing range, the operator can more conveniently remove the offcuts in the second pole through-hole 245 from the top patch, and the removing effect is better, the top patch 240 is unlikely to be damaged, the offcuts are completely removed, and the offcuts may not be left on an inner edge of the top patch 240.

In a possible implementation, referring to FIG. 16, the hole wall 2451 of the second pole through-hole 245 may have a flat surface with a fixed slope. That the hole wall 2451 of the second pole through-hole 245 has a flat surface with a fixed slope means that the hole wall 2451 of the second pole through-hole 245 is in a shape of a side surface of a frustum, a hole diameter of the second pole through-hole 245 gradually increases or decreases, and a change speed remains unchanged.

It may be understood that, when the hole wall 2451 of the second pole through-hole 245 has a flat surface with a fixed slope, there is no need to adjust a cutting angle during machining, the machining tool is less required, and machining accuracy is easy to meet requirements, thereby saving machining costs and improving a yield of the top patch 240.

In another possible implementation, the hole wall 2451 of the second pole through-hole 245 may be a surface with a variable slope. That the hole wall 2451 of the second pole through-hole 245 has a surface with a variable slope means that the hole wall has a curved surface, and the change speed of the hole diameter of the second pole through-hole 245 gradually increases or decreases.

Figure 17:
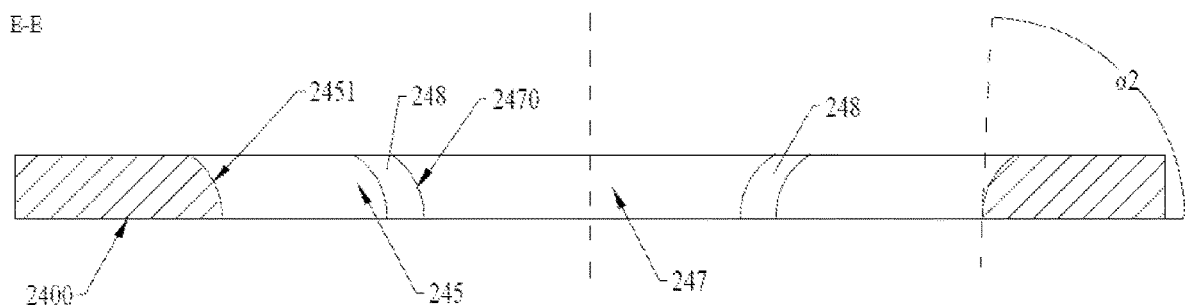
FIG. 17 is another possible schematic cross-sectional view of the top patch shown in FIG. 12 on plane E-E.
Figure 18:
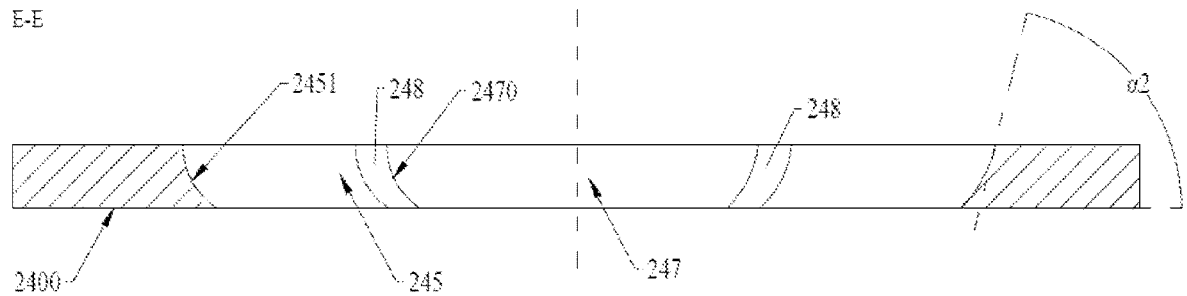
FIG. 18 is yet another possible schematic cross-sectional view of the top patch shown in FIG. 12 on plane E-E.

Specifically, referring to FIG. 17, FIG. 17 is another possible schematic cross-sectional view of the top patch 240 shown in FIG. 12 on plane E-E. The change speed of the hole diameter of the second pole through-hole 245 gradually increases, that is, the hole wall 2451 of the second pole through-hole 245 protrudes toward a center line of the second pole through-hole 245. Alternatively, referring to FIG. 18, FIG. 18 is yet another possible schematic cross-sectional view of the top patch 240 shown in FIG. 12 on plane E-E. The change speed of the hole diameter of the second pole through-hole 245 gradually decreases, that is, the hole wall 2451 of the second pole through-hole 245 is recessed away from a center line of the second pole through-hole 245.

It may be understood that, that the hole wall 2451 of the second pole through-hole 245 is a surface with a variable slope may be adapted for more use scenarios, and this is not strictly limited in embodiments of the present disclosure.

Referring to FIG. 11 and FIG. 12 again, the first explosion-proof valve through-hole 246 is between the first pole through-hole 244 and the second pole through-hole 245. In addition, the first explosion-proof valve through-hole 246, the first pole through-hole 244, and the second pole through-hole 245 are arranged at intervals. A shape of the first explosion-proof valve through-hole 246 may be the same as a shape of the second explosion-proof valve through-hole 234 of the smooth aluminum sheet 230, and the first explosion-proof valve through-hole 246 and the second explosion-proof valve through-hole 234 are defined corresponding to each other and communicate with each other.

The first explosion-proof valve through-hole 246 extends through the top patch 240 in direction Z. Specifically, the first explosion-proof valve through-hole 246 includes a first side wall 2461 and a second side wall 2462 arranged opposite to each other in direction X, and a third side wall 2463 and a fourth side wall 2464 arranged opposite to each other in direction Y. Each of the first side wall 2461 and the second side wall 2462 may have a curved surface. The third side wall 2463 and the fourth side wall 2464 each may have a flat surface.

It may be understood that, referring to FIG. 2 again, in actual use, the smooth aluminum sheet 230 may include an explosion-proof valve 2300, and the second explosion-proof valve through-hole 234 of the smooth aluminum sheet 230 may be connected to the explosion-proof valve 2300 in a sealed manner. The explosion-proof valve 2300 may be exposed beyond the first explosion-proof valve through-hole 246. When internal pressure of the energy-storage apparatus 200 increases due to abnormality of the energy-storage apparatus 200, the internal pressure of the energy-storage apparatus 200 can lift the explosion-proof valve 2300 to complete pressure relief and avoid explosion of the energy-storage apparatus 200.

Figure 19:
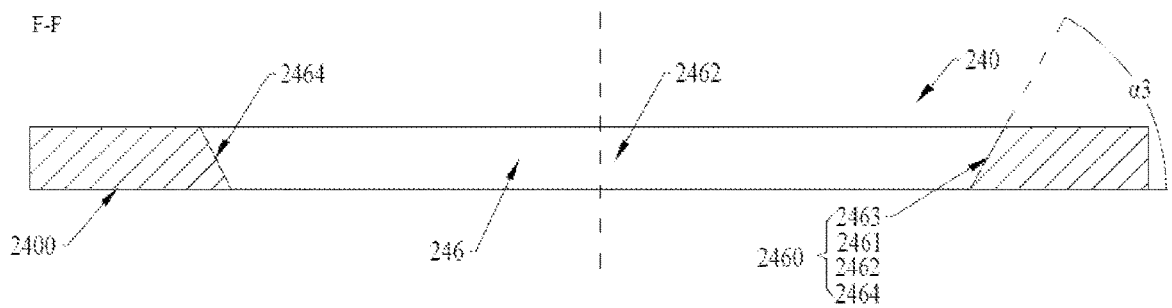
FIG. 19 is a possible schematic cross-sectional view of the top patch shown in FIG. 12 on plane F-F.

Referring to FIG. 12 and FIG. 19, FIG. 19 is a schematic cross-sectional view of the top patch 240 shown in FIG. 12 on plane F-F. The hole wall 2460 of the first explosion-proof valve through-hole 246 is obliquely arranged relative to the connecting surface 2400. In other words, a diameter of the first explosion-proof valve through-hole 246 gradually changes in a direction from the connecting surface 2400 and away from the connecting surface 2400. For example, as shown in FIG. 19, the hole diameter of the first explosion-proof valve through-hole 246 gradually increases in the direction from the connecting surface 2400 and away from the connecting surface 2400.

It may be understood that, the first explosion-proof valve through-hole 246 is defined after cutting a sheet of the top patch 240. In the cutting process, a cutting tool may obliquely cut a corresponding position of the first explosion-proof valve through-hole 246 of the sheet, so that the hole wall 2460 of the first explosion-proof valve through-hole 246 is obliquely arranged. After the sheet is obliquely cut, edges of offcuts inside the first explosion-proof valve through-hole 246 forms a sharp corner, which facilitates an operator to separate the offcuts from the edge and take out the offcuts from top patch 240, thereby saving machining time costs of the top patch 240. For example, the cutting of the top patch 240 in the present disclosure may be in a form of laser cutting or physical blanking.

An angle $\alpha 3$ at which the hole wall 2460 of the first explosion-proof valve through-hole 246 is inclined relative to the connecting surface 2400 ranges from 25 degrees to 85 degrees. It is to be noted that, the angle $\alpha 3$ at which the hole wall 2460 of the first explosion-proof valve through-hole 246 is inclined relative to the connecting surface 2400 is a largest angle among angles between a tangent of any point of the first explosion-proof valve through-hole 246 and the connecting surface 2400.

It may be understood that, when the angle $\alpha 3$ is within the foregoing range, the operator can more conveniently remove the offcuts in the first explosion-proof valve through-hole 246 from the top patch, and the removing effect is better, such that the top patch 240 is unlikely to be damaged, the offcuts are completely removed, and the offcuts may not be left on an inner edge of the top patch 240.

Specifically, each of the first side wall 2461, the second side wall 2462, the third side wall 2463, and the fourth side wall 2464 of the first explosion-proof valve through-hole 246 may be obliquely arranged relative to the connecting surface 2400. The angle $\alpha 3$ between each of the first side wall 2461, the second side wall 2462, the third side wall 2463, and the fourth side wall 2464 and the connecting surface 2400 ranges from 25 degrees to 85 degrees. On one hand, it is avoided that the angle $\alpha 3$ between each of the first side wall 2461, the second side wall 2462, the third side wall 2463, and the fourth side wall 2464 and the connecting surface 2400 is too large, a width of an oblique cutting trace is too large, and an oblique cutting edge to be likely to leave a top-patch offcuts adhesive. On the other hand, it is avoided that the angle $\alpha 3$ between each of the first side wall 2461, the second side wall 2462, the third side wall 2463, and the fourth side wall 2464 and the connecting surface 2400 is too small, that is, when the angle $\alpha 3$ between each of the first side wall 2461, the second side wall 2462, the third side wall 2463 and the fourth side wall 2464 and the connecting surface 2400 approaches 90 degrees, an obliquely-cut inclined surface may not have an inward flange, which is inconvenient for removing the offcuts. The angle $\alpha 3$ between each of the first side wall 2461, the second side wall 2462, the third side wall 2463, and the fourth side wall 2464 and the connecting surface 2400 is set within a reasonable range, so that the offcuts can form a convex edge, thereby facilitating removing of the offcuts.

In a possible implementation, referring to FIG. 19 again, the hole wall 2460 of the first explosion-proof valve through-hole 246 may have a flat surface with a fixed slope. That the hole wall 2460 of the first explosion-proof valve through-hole 246 has a flat surface with a fixed slope means that the hole wall 2460 of the first explosion-proof valve through-hole 246 is in a shape of a side surface of a frustum, a hole diameter of the first explosion-proof valve through-hole 246 gradually increases or decreases, and a change speed remains unchanged.

It may be understood that, when the hole wall 2460 of the first explosion-proof valve through-hole 246 has a flat surface with a fixed slope, there is no need to adjust a cutting angle during machining, the machining tool is less required, and machining accuracy is easy to meet requirements, thereby saving machining costs and improving a yield of the top patch 240.

Specifically, the first side wall 2461, the second side wall 2462, the third side wall 2463, and the fourth side wall 2464 each may have a flat surface. The first side wall 2461, the second side wall 2462, the third side wall 2463, and the fourth side wall 2464 each are neither protruded nor recessed relative to a center line of the first explosion-proof valve through-hole 246.

In another possible implementation, the hole wall 2460 of the first explosion-proof valve through-hole 246 may be a surface with a variable slope. That the hole wall 2460 of the first explosion-proof valve through-hole 246 has a surface with a variable slope means that the hole wall has a curved surface, and the change speed of the hole diameter of the first explosion-proof valve through-hole 246 gradually increases or decreases.

Figure 20:
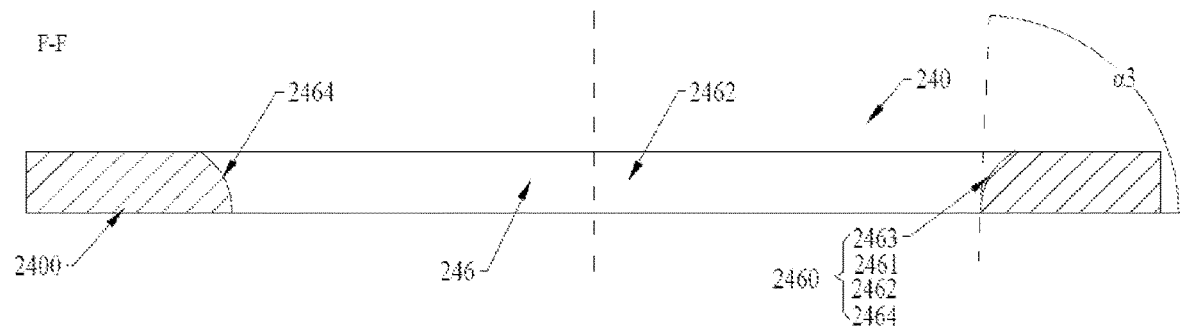
FIG. 20 is another possible schematic cross-sectional view of the top patch shown in FIG. 12 on plane F-F.

For example, referring to FIG. 20, FIG. 20 is another possible schematic cross-sectional view of the top patch 240 shown in FIG. 12 on plane F-F. The change speed of the hole diameter of the first explosion-proof valve through-hole 246 gradually decreases, that is, the hole wall 2460 of the first explosion-proof valve through-hole 246 protrudes away from a center line of the first explosion-proof valve through-hole 246. Specifically, the first side wall 2461, the second side wall 2462, the third side wall 2463, and the fourth side wall 2464 each may be a surface protruding toward the center line of the first explosion-proof valve through-hole 246.

Figure 21:
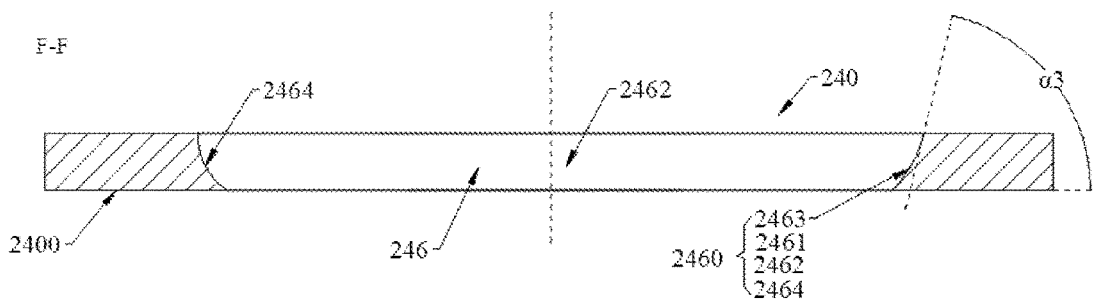
FIG. 21 is yet another possible schematic cross-sectional view of the top patch shown in FIG. 12 on plane F-F.

Alternatively, referring to FIG. 21, FIG. 21 is yet another possible schematic cross-sectional view of the top patch 240 shown in FIG. 12 on plane F-F. The change speed of the hole diameter of the first explosion-proof valve through-hole 246 gradually decreases, that is, the hole wall 2460 of the first explosion-proof valve through-hole 246 is recessed away from a center line of the first explosion-proof valve through-hole 246. Specifically, the first side wall 2461, the second side wall 2462, the third side wall 2463, and the fourth side wall 2464 each may be a surface recessed toward the center line of the first explosion-proof valve through-hole 246.

It may be understood that, that the hole wall 2460 of the first explosion-proof valve through-hole 246 is a surface with a variable slope may be adapted for more use scenarios, and this is not strictly limited in embodiments of the present disclosure.

Referring to FIG. 11 and FIG. 12, the connecting through-hole 247 may communicate the second pole through-hole 245 with the first explosion-proof valve through-hole 246. In direction Y, a length of the connecting through-hole 247 may be less than each of a length of the second pole through-hole 245 in direction Y and a length of the first explosion-proof valve through-hole 246 in direction Y. In this way, on the basis of satisfying that the connecting through-hole 247 communicates the second pole through-hole 245 with the first explosion-proof valve through-hole 246, a structural area around the connecting through-hole 247 is increased as much as possible, so that the connecting through-hole 247 of the top patch 240 can effectively avoid an influence of structural strength due to an excessively thin structure of the top patch 240 while satisfying operating performance (such as exposing an identification 2310 of the smooth aluminum sheet 230 described below). In other embodiments, in direction Y, the length of the connecting through-hole 247 may be greater than each of the length of the second pole through-hole 245 in direction Y and the length of the first explosion-proof valve through-hole 246 in direction Y. Alternatively, in direction Y, the length of the connecting through-hole 247, the length of the second pole through-hole 245, and the length of the first explosion-proof valve through-hole 246 may be the same.

It may be understood that, an existing top patch generally defines three through holes, namely, a positive electrode through-hole, a negative electrode through-hole, and an explosion-proof valve through-hole, an area of a connection region between every two of the three holes is relatively small, and a structure of a joint is relatively weak. In a process of removing the offcuts to define the positive electrode through-hole, the negative electrode through-hole, and the explosion-proof valve through-hole, the joint between every two holes is likely to be broken. In embodiments of the present disclosure, the first hole 2404 is defined to communicate the second pole through-hole 245 with the first explosion-proof valve through-hole 246, so that to-be-removed offcuts in the top patch 240 may be large offcuts, which can not only keep structural integrity of the top patch 240, but also effectively prevent a portion with a weak structure from being broken due to a force in the process of removing the offcuts in the top patch 240, and connection strength of the top patch is better.

In addition, due to the weak structure of the joint between the through holes of the top patch in the related art, deformation is likely to occur in the process of removing the offcuts, mounting with an end cap assembly, and the like, and consequently, the top patch cannot be kept flat, and an inner edge or outer edge of the top patch is likely to be warped. In embodiments of the present disclosure, the first hole 2404 is defined to communicate the second pole through-hole 245 with the first explosion-proof valve through-hole 246, to avoid problems such as warpage of the top patch 240 and a difficulty in a subsequent mounting process of the top patch 240 due to deformation at a joint of each hole.

Furthermore, arrangement of the connecting through-hole 247 can reduce a volume of the top patch 240 occupied by configuring this portion as a physical structure, thereby saving a material of the top patch 240. Since a weight of the top patch 240 is reduced, a weight of the whole energy-storage apparatus 200 is also reduced. In addition, since the connecting through-hole 247 communicates the second pole through-hole 245 with the first explosion-proof valve through-hole 246, only two pieces of offcuts (offcuts of the first pole through-hole 244 and offcuts of a whole for connecting the second pole through-hole 245, the connecting through-hole 247, and the first explosion-proof valve through-hole 246) are present in the top patch 240 during actual preparation. Therefore, when the top patch 240 is mounted, a step of removing internal residual materials is relatively simple, which not only improves a molding yield of the top patch 240, but also saves production time costs.

Figure 22:
FIG. 22 is a schematic cross-sectional view of the top patch shown in FIG. 12 on plane G-G.

Referring to FIG. 12 and FIG. 22, FIG. 22 is a schematic cross-sectional view of the top patch 240 shown in FIG. 12 on plane G-G. The hole wall 2470 of the connecting through-hole 247 is obliquely arranged relative to the connecting surface 2400. In other words, a diameter of the connecting through-hole 247 gradually changes in a direction from the connecting surface 2400 and away from the connecting surface 2400. For example, as shown in FIG. 22, the hole diameter of the connecting through-hole 247 gradually increases in the direction from the connecting surface 2400 and away from the connecting surface 2400.

It may be understood that, the second pole through-hole 245, the connecting through-hole 247, and the first explosion-proof valve through-hole 246 form a communicated elongated hole. The elongated hole is defined after cutting the sheet of the top patch 240. In the cutting process, the cutting tool can obliquely cut a corresponding position of the sheet to form the elongated hole with a hole wall arranged obliquely. After the sheet is obliquely cut, edges of offcuts inside the elongated hole forms a sharp corner, which facilitates an operator to separate the offcuts from the edge and take out the offcuts from the top patch 240, thereby saving machining time costs of the top patch 240.

An angle α4 at which the hole wall 2470 of the connecting through-hole 247 is inclined relative to the connecting surface 2400 ranges from 25 degrees to 85 degrees. It is to be noted that, the angle α4 at which the hole wall 2470 of the connecting through-hole 247 is inclined relative to the connecting surface 2400 is a largest angle among angles between a tangent of any point of the connecting through-hole 247 and the connecting surface 2400. A surface of the hole wall 2470 of the connecting through-hole 247 may have a flat surface with a fixed slope. Alternatively, the surface of the hole wall 2470 of the connecting through-hole 247 may be a surface with a variable slope.

It may be understood that, when the angle α4 is within the foregoing range, the operator can more conveniently remove the offcuts in the connecting through-hole 247 from the top patch, and the removing effect is better, the top patch 240 is unlikely to be damaged, the offcuts are completely removed, and the offcuts may not be left on an inner edge of the top patch 240.

Specifically, the connecting through-hole 247 includes a fifth side wall 2471 and a sixth side wall 2472 arranged opposite to each other in direction Y. As shown in FIG. 22, both the fifth side wall 2471 and the sixth side wall 2472 may be arranged obliquely relative to the connecting surface

2400. The angle α4 between the connecting surface 2400 and each of the fifth side wall 2471 and the sixth side wall 2472 ranges from 25 degrees to 85 degrees. On one hand, it is avoided that the angle α4 between the connecting surface 2400 and each of the fifth side wall 2471 and the sixth side wall 2472 is too large, a width of an oblique cutting trace is too large, and an oblique cutting edge to be likely to leave a top-patch offcuts adhesive. On the other hand, it is avoided that the angle α4 between the connecting surface 2400 and each of the fifth side wall 2471 and the sixth side wall 2472 is too small, that is, when the angle α4 between the connecting surface 2400 and each of the fifth side wall 2471 and the sixth side wall 2472 approaches 90 degrees, an obliquely-cut inclined surface may not have an inward flange, which is inconvenient for removing the offcuts. The angle α4 between the connecting surface 2400 and each of the fifth side wall 2471 and the sixth side wall 2472 is set within a reasonable range, so that the offcuts can form a convex edge, thereby facilitating removing of the offcuts.

In a possible implementation, referring to FIG. 22, the hole wall 2470 of the connecting through-hole 247 may have a flat surface with a fixed slope. That the hole wall 2470 of the connecting through-hole 247 has a flat surface with a fixed slope means that the hole wall 2470 of the connecting through-hole 247 is in a shape of a side surface of a frustum, a hole diameter of the connecting through-hole 247 gradually increases or decreases, and a change speed remains unchanged. Specifically, the fifth side wall 2471 and the sixth side wall 2472 each may have a flat surface.

It may be understood that, when the hole wall 2470 of the connecting through-hole 247 has a flat surface with a fixed slope, there is no need to adjust a cutting angle during machining, the machining tool is less required, and machining accuracy is easy to meet requirements, thereby saving machining costs and improving a yield of the top patch 240.

In another possible implementation, the hole wall 2470 of the connecting through-hole 247 may be a surface with a variable slope. That the hole wall 2470 of the connecting through-hole 247 is has surface with a variable slope means that the hole wall has a curved surface, and the change speed of the hole diameter of the connecting through-hole 247 gradually increases or decreases.

For example, referring to FIG. 17, FIG. 17 is another possible schematic cross-sectional view of the top patch 240 shown in FIG. 12 on plane E-E. The change speed of the hole diameter of the connecting through-hole 247 gradually increases, that is, the hole wall 2470 of the connecting through-hole 247 protrudes toward a center line of the connecting through-hole 247. Specifically, the fifth side wall 2471 and the sixth side wall 2472 may be surfaces protruding toward the center line of the first explosion-proof valve through-hole 246.

Alternatively, referring to FIG. 18, FIG. 18 is yet another possible schematic cross-sectional view of the top patch 240 shown in FIG. 12 on plane E-E. The change speed of the hole diameter of the connecting through-hole 247 gradually decreases, that is, the hole wall 2470 of the connecting through-hole 247 is recessed away from a center line of the connecting through-hole 247. Specifically, the fifth side wall 2471 and the sixth side wall 2472 each may be a surface recessed away from the center line of the first explosion-proof valve through-hole 246.

It may be noted that, the hole wall of the first pole through-hole 244, the hole wall of the second pole through-hole 245, the hole wall of the first explosion-proof valve through-hole 246, and the hole wall of the connecting through-hole 247 mentioned above each may be recessed away from or protruded toward the center line of the hole wall thereof. However, the structure of the top patch 240 provided in the present disclosure is not limited to the foregoing implementations, and the hole wall of the first pole through-hole 244, the hole wall of the second pole through-hole 245, the hole wall of the first explosion-proof valve through-hole 246, and the hole wall of the connecting through-hole 247 each may have one or more of a surface protruding toward the center lines thereof, a surface recessed away from the center lines thereof, or a flat surface. This is not strictly limited in embodiments of the present disclosure.

It may be understood that, that the hole wall 2470 of the connecting through-hole 247 is a surface with a variable slope may be adapted for more use scenarios, and this is not strictly limited in embodiments of the present disclosure.

Referring to FIG. 12 again, the fifth side wall 2471 includes a fifth end 2473 and a sixth end 2474 arranged opposite to each other in direction X. The fifth end 2473 is arranged toward the second pole through-hole 245, and the sixth end 2474 is arranged toward the first explosion-proof valve through-hole 246. The sixth side wall 2472 includes a seventh end 2475 and an eighth end 2476 arranged opposite to each other in direction X. The seventh end 2475 is arranged toward the second pole through-hole 245, and the eighth end 2476 is arranged toward the first explosion-proof valve through-hole 246.

In embodiments of the present disclosure, the hole wall 2470 of the connecting through-hole 247 is connected to the hole wall 2451 of the second pole through-hole 245 through a first curved surface 248. A radius of curvature of the first curved surface 248 ranges from 1 mm to 5 mm (including end point values of 1 mm and 5 mm). Specifically, the fifth end 2473 of the fifth side wall 2471 is connected to the hole wall 2451 of the second pole through-hole 245 through one first curved surface 248. Specifically, the seventh end 2475 of the sixth side wall 2472 is connected to the hole wall 2451 of the second pole through-hole 245 through the other first curved surface 248.

It may be understood that, the hole wall 2470 of the connecting through-hole 247 is smoothly connected to the hole wall 2451 of the second pole through-hole 245 through the first curved surface 248, so that the top patch 240 may have a relatively smooth inner edge. The relatively smooth inner edge can avoid scratching and wear of a wrapping film 250, the smooth aluminum sheet 230, or an electrode caused by a sharp edge when the top patch 240 is assembled with another component of the energy-storage apparatus 200. The relatively smooth inner edge can also make the top patch 240 have good mounting stability, which is beneficial to avoid warpage of edges of through holes in a middle part of the top patch 240 due to poor coordination with the smooth aluminum sheet 230 during installation, and an adverse effect on mounting reliability of the top patch 240.

In embodiments of the present disclosure, the hole wall 2470 of the connecting through-hole 247 is connected to the hole wall of the first explosion-proof valve through-hole 246 through a second curved surface 249. A radius of curvature of the second curved surface 249 ranges from 1 mm to 5 mm (including end point values of 1 mm and 5 mm). Specifically, the sixth end 2474 of the fifth side wall 2471 is connected to one end of the first side wall 2461 of the first explosion-proof valve through-hole 246 through one second curved surface 249. The seventh end 2475 of the sixth side wall 2472 is connected to another end of the first side wall 2461 of the first explosion-proof valve through-hole 246 through the other second curved surface 249.

It may be understood that, the hole wall 2460 of the first explosion-proof valve through-hole 246 of the top patch 240 is smoothly connected to the hole wall 2470 of the connecting through-hole 247 of the top patch 240 through the second curved surface 249, so that the inner edge of the top patch 240 does not have a relatively sharp angle, thereby avoiding an operation of accurately aligning the top patch 240 with the smooth aluminum sheet 230 at a sharp corner, and simplifying a coordination connection process between the top patch 240 and the smooth aluminum sheet 230.

Referring to FIG. 4, the connecting through-hole 247 may be an identification-through hole, and an identification 2310 arranged on the first surface 2312 of the smooth aluminum sheet 230 may be exposed beyond the identification through-hole. With such arrangement, the identification 2310 at a position of the smooth aluminum sheet 230 corresponding to the connecting through-hole 247 may be exposed beyond the connecting through-hole 247. In addition, since the top patch 240 and the negative electrode protrusion 233 are arranged around the identification 2310, and a position of the identification 2310 is recessed relative to the top patch 240 and the negative electrode protrusion 233, the position of the identification 2310 is unlikely to be scratched by foreign objects and has good reliability.

Referring to FIG. 12 again, a distance between the hole wall 2451 of the second pole through-hole 245 and the outer edge of the top patch 240 in the width direction (that is, direction Y) of the smooth aluminum sheet 230 is a second distance L2. The second distance L2 is also a narrowest portion of a physical structure of the top patch 240. The second distance L2 may range from 2 mm to 5 mm (including endpoint values of 2 mm and 5 mm). It is to be noted that, the distance between the hole wall 2451 of the second pole through-hole 245 and the outer edge of the top patch 240 may be the same as or different from a distance between the first pole through-hole 244 and the outer edge of the top patch 240.

In a possible implementation, the second distance L2 is greater than the third distance L3. In other words, in the width direction (that is, direction Y) of the smooth aluminum sheet 230, a width of the narrowest portion of the top patch 240 is greater than the width of the wrapping film 250 covering the portion of the first surface 2312 of the smooth aluminum sheet 230. With such arrangement, the top patch 240 can completely cover the edge of the wrapping film 250 on the first surface 2312 of the smooth aluminum sheet 230, so that after the top patch 240 is connected to the smooth aluminum sheet 230, warpage of a portion of the edge of the wrapping film 250 on the surface of the smooth aluminum sheet 230 can be avoided.

For example, the second distance L2 may also be less than the first distance L1. In other words, in the width direction (that is, direction Y) of the smooth aluminum sheet 230, the width of the narrowest portion of the top patch sheet 240 is less than a width between the positive electrode protrusion 232 and/or the negative electrode protrusion 233 of the smooth aluminum sheet 230 and the outer edge of the smooth aluminum sheet 230. Therefore, after the top patch 240 is attached to the smooth aluminum sheet 230, the top patch 240 may not fall off because the outer edge of the top patch 240 protrudes relative to the outer edge of the smooth aluminum sheet 230.

Further, a difference between the first distance L1 and the second distance L2 may be greater than a difference between the second distance L2 and the third distance L3. In other words, in the width direction (that is, direction Y) of the smooth aluminum sheet 230, a difference between the width of the narrowest portion of the top patch 240 and the distance between the protrusion (the positive electrode protrusion 232 and/or the negative electrode protrusion 233) of the smooth aluminum sheet 230 and the outer edge of the smooth aluminum sheet 230 is greater than a difference between the width of the narrowest portion of the top patch 240 and a width of the wrapping film 250 on the first surface 2312.

In this way, the top patch 240 may completely cover the edge of the wrapping film 250 on the first surface 2312, and a portion of the top patch 240 may also be attached to the smooth aluminum sheet 230, thereby better pressing the edge of the wrapping film 250 on the smooth aluminum sheet 230.

Still referring to FIG. 11 and FIG. 12, the top patch 240 includes a liquid-injection-hole sealing-portion 2401. The liquid-injection-hole sealing-portion 2401 is between the first pole through-hole 244 and the first explosion-proof valve through-hole 246. The liquid-injection-hole sealing-portion 2401 includes a sealing surface 2402, where the sealing surface 2402 is a part of a surface of the top patch 240 facing the smooth aluminum sheet 230. The top patch 240 further includes an adhesive layer 2403. The adhesive layer 2403 is arranged on the sealing surface 2402. The adhesive layer 2403 is spaced apart from an edge of the first pole through-hole 244, an edge of the second pole through-hole 245, and an edge of the top patch 240, to prevent an adhesive from overflowing to the liquid-injection-hole sealing-portion 2401 and causing adverse effects on the operating performance of the energy-storage apparatus 200. The liquid-injection-hole sealing-portion 2401 is connected to the liquid-injection hole 235 through the adhesive layer 2403, so that the adhesive layer 2403 seals the liquid-injection hole 235.

It may be understood that, sealing performance of the liquid-injection hole 235 has a great influence on a service life and performance of the energy-storage apparatus 200. If the liquid-injection hole of the energy-storage apparatus is not sealed, an electrolyte solution or other components inside the energy-storage apparatus may be oxidized and corroded by external gas or foreign matters. The top patch 240 of the present disclosure can seal the liquid-injection hole 235 of the smooth aluminum sheet 230 while connecting the top patch 240 to the smooth aluminum sheet 230 by arranging the adhesive layer 2403 and enabling the adhesive layer 2403 to seal the liquid-injection hole 235, thereby reducing occurrence of electrolyte leakage and the like in the liquid-injection hole 235 of the energy-storage apparatus 200.

In addition, since the liquid-injection-hole top-surface 2353 is recessed relative to the smooth aluminum-sheet body 231, and the adhesive layer 2403 located on the sealing surface 2402 of the top patch 240 is protruded relative to the surface of the top patch 240, after the adhesive layer 2403 is correspondingly connected to the liquid-injection hole 235, at least a part of the adhesive layer 2403 can be accommodated in the liquid-injection hole 235, so that the top patch 240 can be more flatly attached to the surface of the smooth aluminum sheet 230, thereby improving flatness of installation of the top patch 240.

The embodiments of the present disclosure are introduced in detail above. The principles and implementations of the present disclosure are described by applying specific examples in this specification, and the descriptions of the embodiments are merely intended to help understand the method and the core ideas of the present disclosure. Meanwhile, a person of ordinary skill in the art may make modifications to the specific implementations and application scopes according to the ideas of the present disclosure. In conclusion, the content of the specification may not be construed as a limitation to the present disclosure.

What is claimed is:

1. A top patch configured to be attached to a smooth aluminum sheet of an energy-storage apparatus, wherein: the top patch defines a first pole through-hole and a first hole spaced apart from the first pole through-hole in a length direction of the top patch; the first hole comprises two side walls arranged opposite to each other in a width direction of the top patch; each of the two side walls is provided with an extension bump; the first hole at one side of the extension bump forms a first explosion-proof valve through-hole; the first hole at the other side of the extension bump forms a second pole through-hole; the top patch further comprises a connecting surface configured to be connected to the smooth aluminum sheet; each of a hole wall of the first pole through-hole, a hole wall of the second pole through-hole, and a hole wall of the first explosion-proof valve through-hole is arranged obliquely relative to the connecting surface; and an angle at which each of the hole wall of the first pole through-hole, the hole wall of the second pole through-hole, and the hole wall of the first explosion-proof valve through-hole is inclined relative to the connecting surface ranges from 25 degrees to 85 degrees.

2. The top patch according to claim 1, wherein each of the hole wall of the first pole through-hole, the hole wall of the second pole through-hole, and the hole wall of the first explosion-proof valve through-hole has a flat surface with a fixed slope; or
each of the hole wall of the first pole through-hole, the hole wall of the second pole through-hole, and the hole wall of the first explosion-proof valve through-hole has a curved surface with a variable slope.

3. The top patch according to claim 1, wherein the first hole between the two extension bumps forms a connecting through-hole, the connecting through-hole is located between the second pole through-hole and the first explosion-proof valve through-hole, the connecting through-hole communicates with the second pole through-hole and the first explosion-proof valve through-hole, and a hole wall of the connecting through-hole is obliquely arranged relative to the connecting surface.

4. The top patch according to claim 3, wherein each of the two extension bumps further has a first curved surface, and the hole wall of the connecting through-hole is connected to the hole wall of the second pole through-hole through the first curved surface.

5. The top patch according to claim 4, wherein a radius of curvature of the first curved surface ranges from 1 mm to 5 mm.

6. The top patch according to claim 3, wherein the first hole further has a second curved surface, and the hole wall of the connecting through-hole is connected to the hole wall of the first explosion-proof valve through-hole through the second curved surface.

7. The top patch according to claim 6, wherein a radius of curvature of the second curved surface ranges from 1 mm to 5 mm.

8. The top patch according to claim 1, wherein in the width direction of the top patch, a length of each of the two extension bumps protruding relative to one side wall ranges from 0.5 mm to 5.5 mm.

9. The top patch according to claim 1, wherein in the width direction of the top patch, a distance between the hole wall of the second pole through-hole and an outer edge of the top patch ranges from 2 mm to 5 mm.

10. The top patch according to claim 9, wherein in the width direction of the top patch, a ratio of the distance between the hole wall of the second pole through-hole and the outer edge of the top patch to a width of the second pole through-hole ranges from 1/6 to 1/4.

11. The top patch according to claim 3, wherein the connecting through-hole is an identification through-hole, and an identification on the smooth aluminum sheet is exposed beyond the identification through-hole.

12. An energy-storage apparatus comprising a smooth aluminum sheet and a top patch, wherein: the top patch is attached to a top surface of the smooth aluminum sheet; the top patch defines a first pole through-hole and a first hole spaced apart from the first pole through-hole in a length direction of the top patch; the first hole comprises two side walls arranged opposite to each other in a width direction of the top patch; each of the two side walls is provided with an extension bump; the first hole at one side of the extension bump forms a first explosion-proof valve through-hole; the first hole at the other side of the extension bump forms a second pole through-hole; the top patch further comprises a connecting surface configured to be connected to the smooth aluminum sheet; each of a hole wall of the first pole through-hole, a hole wall of the second pole through-hole, and a hole wall of the first explosion-proof valve through-hole is arranged obliquely relative to the connecting surface; and an angle at which each of the hole wall of the first pole through-hole, the hole wall of the second pole through-hole, and the hole wall of the first explosion-proof valve through-hole is inclined relative to the connecting surface ranges from 25 degrees to 85 degrees.

13. The energy-storage apparatus according to claim 12, wherein the smooth aluminum sheet comprises a smooth aluminum-sheet body and a negative electrode protrusion, wherein the negative electrode protrusion protrudes from the smooth aluminum-sheet body, and the negative electrode protrusion is exposed beyond the second pole through-hole; and
in a width direction of the smooth aluminum sheet, a distance between an edge of the negative electrode protrusion and an edge of the smooth aluminum-sheet body is a first distance, the distance between the hole wall of the second pole through-hole and an outer edge of the top patch is a second distance, and the second distance is less than the first distance.

14. The energy-storage apparatus according to claim 13, wherein the smooth aluminum-sheet body has a first surface facing the top patch, the energy-storage apparatus further comprises a wrapping film, and an edge of the wrapping film covers a portion of an edge of the first surface; and
in the width direction of the smooth aluminum sheet, a width of the wrapping film covering the portion of the first surface is a third distance, and the second distance is greater than the third distance.

15. The energy-storage apparatus according to claim 12, wherein each of the hole wall of the first pole through-hole, the hole wall of the second pole through-hole, and the hole wall of the first explosion-proof valve through-hole has a flat surface with a fixed slope; or
each of the hole wall of the first pole through-hole, the hole wall of the second pole through-hole, and the hole wall of the first explosion-proof valve through-hole has a curved surface with a variable slope.

16. The energy-storage apparatus according to claim 12, wherein: the first hole between the two extension bumps forms a connecting through-hole, the connecting through-hole is located between the second pole through-hole and the first explosion-proof valve through-hole, the connecting through-hole communicates with the second pole through-hole and the first explosion-proof valve through-hole, and a hole wall of the connecting through-hole is obliquely arranged relative to the connecting surface.

17. An electricity-consumption device, comprising an energy-storage apparatus, wherein: the energy-storage apparatus comprises a smooth aluminum sheet and a top patch; the top patch is attached to a top surface of the smooth aluminum sheet; the top patch defines a first pole through-hole and a first hole spaced apart from the first pole through-hole in a length direction of the top patch; the first hole comprises two side walls arranged opposite to each other in a width direction of the top patch; each of the two side walls is provided with an extension bump; the first hole at one side of the extension bump forms a first explosion-proof valve through-hole; the first hole at the other side of the extension bump forms a second pole through-hole; the top patch further comprises a connecting surface configured to be connected to the smooth aluminum sheet; each of a hole wall of the first pole through-hole, a hole wall of the second pole through-hole, and a hole wall of the first explosion-proof valve through-hole is arranged obliquely relative to the connecting surface; and an angle at which each of the hole wall of the first pole through-hole, the hole wall of the second pole through-hole, and the hole wall of the first explosion-proof valve through-hole is inclined relative to the connecting surface ranges from 25 degrees to 85 degrees.

18. The electricity-consumption device according to claim 17, wherein in the width direction of the top patch, a length of each of the two extension bumps protruding relative to one side wall ranges from 0.5 mm to 5.5 mm.

19. The electricity-consumption device according to claim 17, wherein in the width direction of the top patch, a distance between the hole wall of the second pole through-hole and an outer edge of the top patch ranges from 2 mm to 5 mm.

20. The electricity-consumption device according to claim 19, wherein in the width direction of the top patch, a ratio of the distance between the hole wall of the second pole through-hole and the outer edge of the top patch to a width of the second pole through-hole ranges from ⅙ to ¼.

* * * * *